(12) United States Patent
Wang et al.

(10) Patent No.: US 12,512,902 B2
(45) Date of Patent: Dec. 30, 2025

(54) FLEXIBLE FREQUENCY BAND PAIRING FOR SATELLITE COMMUNICATIONS

(71) Applicant: Google LLC, Mountain View, CA (US)

(72) Inventors: Jibing Wang, San Jose, CA (US); Aamir Akram, San Jose, CA (US); Erik Richard Stauffer, Sunnyvale, CA (US); Sharath Ananth, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 161 days.

(21) Appl. No.: 18/252,460

(22) PCT Filed: Nov. 8, 2021

(86) PCT No.: PCT/US2021/058463
§ 371 (c)(1),
(2) Date: May 10, 2023

(87) PCT Pub. No.: WO2022/103701
PCT Pub. Date: May 19, 2022

(65) Prior Publication Data
US 2024/0014888 A1    Jan. 11, 2024

Related U.S. Application Data

(60) Provisional application No. 63/112,378, filed on Nov. 11, 2020.

(51) Int. Cl.
*H04B 7/185* (2006.01)
*H04L 1/08* (2006.01)
*H04L 5/00* (2006.01)

(52) U.S. Cl.
CPC ..... *H04B 7/18513* (2013.01); *H04B 7/18563* (2013.01); *H04L 1/08* (2013.01); *H04L 5/0016* (2013.01); *H04B 7/18532* (2013.01)

(58) Field of Classification Search
CPC ............ H04B 7/18513; H04B 7/18563; H04B 7/18632; H04L 1/08; H04L 5/0016
See application file for complete search history.

(56) References Cited

U.S. PATENT DOCUMENTS 9,609,651 B1    3/2017  Sung et al.
10,051,608 B2 *  8/2018  Huber ................... H04L 5/0064
(Continued)

FOREIGN PATENT DOCUMENTS

WO    2019159548    8/2019
WO    2021258390    12/2021
(Continued)

OTHER PUBLICATIONS

US Notice of Allowance issued on Nov. 6, 2024 in related U.S. Appl. No. 18/252,500.
(Continued)

*Primary Examiner* — Jaison Joseph
(74) *Attorney, Agent, or Firm* — PATENT PORTFOLIO BUILDERS PLLC

(57) ABSTRACT

This document describes techniques for flexible frequency band pairing for satellite communications. In aspects, a non-terrestrial communication system uses multiple frequency bands for a wireless link between a user equipment, UE, and a satellite of the non-terrestrial communication system. The non-terrestrial communication system determines to utilize two different frequency bands the wireless link between the satellite and the UE, the two different frequency bands being defined by a governing entity. In response, the non-terrestrial based communication system selects a first defined frequency band for downlink communications from the satellite to the UE and a second defined frequency band for uplink communications from the UE to the satellite. The non-terrestrial communication system then directs the satellite and the UE to communicate via the
(Continued)

wireless link by using the first defined frequency band for the downlink communications and the second defined frequency band for the uplink communications.

20 Claims, 7 Drawing Sheets

(56) References Cited

U.S. PATENT DOCUMENTS

| | | | |
|---|---|---|---|
| 10,404,415 B2 | 9/2019 | Morioka et al. | |
| 2003/0054762 A1* | 3/2003 | Karabinis | H04B 7/18563 455/12.1 |
| 2005/0239403 A1* | 10/2005 | Karabinis | H04B 7/18563 455/12.1 |
| 2007/0025283 A1* | 2/2007 | Koslov | H04B 7/18517 375/264 |
| 2009/0131047 A1* | 5/2009 | Amerga | H04W 48/16 455/434 |
| 2010/0009677 A1 | 1/2010 | Karabinis et al. | |
| 2010/0195507 A1* | 8/2010 | Marinier | H04L 1/20 370/242 |
| 2012/0122506 A1 | 5/2012 | Soliman | |
| 2014/0065950 A1* | 3/2014 | Mendelsohn | H04B 7/0408 455/12.1 |
| 2015/0215947 A1* | 7/2015 | Kaukovuori | H04W 72/541 370/329 |
| 2016/0381519 A1 | 12/2016 | Lauer et al. | |
| 2017/0325248 A1 | 11/2017 | Mizusawa | |
| 2017/0359838 A1 | 12/2017 | Xiao et al. | |
| 2018/0069621 A1* | 3/2018 | Tong | H04B 7/2041 |
| 2018/0279297 A1 | 9/2018 | Nogami et al. | |
| 2019/0098607 A1 | 3/2019 | Zhang et al. | |
| 2019/0239082 A1* | 8/2019 | Ravishankar | H04B 7/18528 |
| 2020/0022149 A1 | 1/2020 | Beale et al. | |
| 2020/0068538 A1 | 2/2020 | Wang et al. | |
| 2021/0036769 A1* | 2/2021 | Sorond | H04B 7/2615 |
| 2021/0068104 A1* | 3/2021 | Chen | H04L 5/0094 |
| 2021/0120429 A1* | 4/2021 | Liu | H04L 5/0091 |
| 2021/0127382 A1* | 4/2021 | Garcia | H04W 72/542 |
| 2021/0185646 A1* | 6/2021 | Zhou | H04B 7/0404 |
| 2022/0015148 A1* | 1/2022 | Sengupta | H04W 74/0833 |
| 2022/0030478 A1* | 1/2022 | Shi | H04W 36/0061 |
| 2022/0030560 A1* | 1/2022 | Hosseinian | H04L 1/1835 |
| 2022/0052779 A1 | 2/2022 | Ye et al. | |
| 2022/0225068 A1* | 7/2022 | Luo | H04W 72/1215 |
| 2023/0156459 A1* | 5/2023 | Jin | H04W 8/24 370/280 |
| 2023/0217474 A1* | 7/2023 | Xu | H04W 72/54 370/235 |
| 2023/0268990 A1* | 8/2023 | Sharma | H04B 7/18532 455/427 |
| 2024/0014888 A1* | 1/2024 | Wang | H04B 7/18513 |

FOREIGN PATENT DOCUMENTS

| | | |
|---|---|---|
| WO | 2022103616 | 5/2022 |
| WO | 2022103701 | 5/2022 |

OTHER PUBLICATIONS

"Discussion on HARQ enhancement", 3GPP TSG RAN WG1 #102, R1-2006031, Aug. 2020, 4 pages.
"Discussion on HARQ enhancement for NTN", 3GPP TSG RAN WG1 Meeting #102-e, R1-2005267, Aug. 2020, 5 pages.
"Discussion on HARQ enhancement for NTN", 3GPP TSG RAN WG1 Meeting #103-e—R1-2007571, Nov. 2020.
"Discussion on HARQ for NTN", 3GPP TSG RAN WG1 Meeting #98bis, R1-1910065, Oct. 2019, 4 pages.
"Discussion on PDCCH repetition for URLLC", 3GPP TSG RAN WG1 Meeting #92—R1-1801549, Mar. 2018, 6 pages.
"HARQ procedure in NTN", 3GPP TSG RAN WG1 Meeting #97, R1-1906954, May 2019.
"International Preliminary Report on Patentability", Application No. PCT/US2021/058463, Jan. 25, 2023, 13 pages.
"International Search Report and Written Opinion", Application No. PCT/US2021/058463, Feb. 16, 2022, 11 pages.
"International Search Report and Written Opinion", Application No. PCT/US2021/057594, Mar. 7, 2022, 11 pages.
"Solutions for NR to support non-terrestrial networks (NTN)", 3GPP TR 38.821 V16.0.0, Dec. 2019, 140 pages.
"Written Opinion", Application No. PCT/US2021/058463, Sep. 29, 2022, 5 pages.
Cassiau, et al., "Satellite and Terrestrial Multi-Connectivity for 5G: Making Spectrum Sharing Possible", Apr. 6, 2020, 6 pages.
Examination Report in corresponding/related Indian Application No. 202347032747 dated Mar. 18, 2024.
Examination Report in corresponding/related Indian Application No. 202347034881 dated Mar. 19, 2024.
Office Action in corresponding/related EP Application No. 21820371.9 dated Dec. 12, 2024.

* cited by examiner

FLEXIBLE FREQUENCY BAND PAIRING FOR SATELLITE COMMUNICATIONS

RELATED APPLICATION(S)

This application is a national stage entry of International Application No. PCT/US2021/058463, filed Nov. 8, 2021, which claims the benefit of U.S. Provisional Application No. 63/112,378, filed Nov. 11, 2020, the disclosures of which are incorporated herein by reference in their entirety.

BACKGROUND

Non-terrestrial networks (NTN), such as satellite-based communication systems, provide flexibility to end users. To illustrate, a single satellite that acts as a relay can provide coverage to remote locations that are difficult to reach, such as mountainous or oceanic areas with limited accessibility. However, non-terrestrial communications also pose challenges. To illustrate, satellite communications experience large propagation loss that results in poor signal quality and/or increased bit errors at a receiver. As another example, the radio frequency (RF) bands allocated to non-terrestrial communications may have different power-density limitations enforced by a regulatory body (e.g., Federal Communications Commission (FCC), International Telecommunication Union (ITU)). In some scenarios, the (regulated) power-density limitations result in low signal-to-noise ratios (SNR) and poor signal quality at a receiver, such as when a UE operates at the edge of a cell. With recent advancements in wireless communication systems, new approaches may be available to improve a quality and/or reliability of services provided by non-terrestrial communication systems.

SUMMARY

This document describes techniques for flexible frequency band pairing for satellite communications. In some aspects, a non-terrestrial communication system uses multiple frequency bands for a wireless link between a user equipment, UE, and a satellite of the non-terrestrial communication system. The non-terrestrial communication system determines to utilize two different frequency bands (e.g., government-defined frequency bands, standards-defined frequency bands, regulated frequency bands) for the wireless link between the UE and the satellite. In response to determining to utilize the two different frequency bands, the non-terrestrial communication system selects a first defined frequency band (e.g., defined by a governing entity, such as government-defined frequency bands, standards-defined frequency bands, regulated frequency bands)) for downlink communications from the satellite to the UE and a second defined frequency band (e.g., defined by the governing entity) for uplink communications from the UE to the satellite. The non-terrestrial communication system then directs the satellite and the UE to communicate via the wireless link using the first defined frequency band for the downlink communications and the second defined frequency band for the uplink communications.

In aspects, a UE uses multiple frequency bands for a wireless link between the UE and a satellite in a non-terrestrial communication system. The UE receives, from the non-terrestrial communication system, directions to utilize two different frequency bands (e.g., defined by a governing entity, such as government-defined frequency bands, standards-defined frequency bands, regulated frequency bands) for wireless communications transferred over the wireless link between the UE and the satellite. In response to receiving the directions, the UE communicates with the satellite via the wireless link by using a first defined frequency band for downlink communications and a second defined frequency band that is different from the first defined frequency band for uplink communications.

The details of one or more implementations are set forth in the accompanying drawings and the following description. Other features and advantages will be apparent from the description, drawings, and examples described herein. This summary is provided to introduce subject matter that is further described in the Detailed Description and Drawings. Accordingly, this summary should not be considered to describe essential features nor used to limit the scope of the described subject matter.

BRIEF DESCRIPTION OF THE DRAWINGS

The details of one or more aspects of flexible frequency band pairing for satellite communications are described below. The use of the same reference numbers in different instances in the description and the figures may indicate like elements.

DETAILED DESCRIPTION

Figure 1:
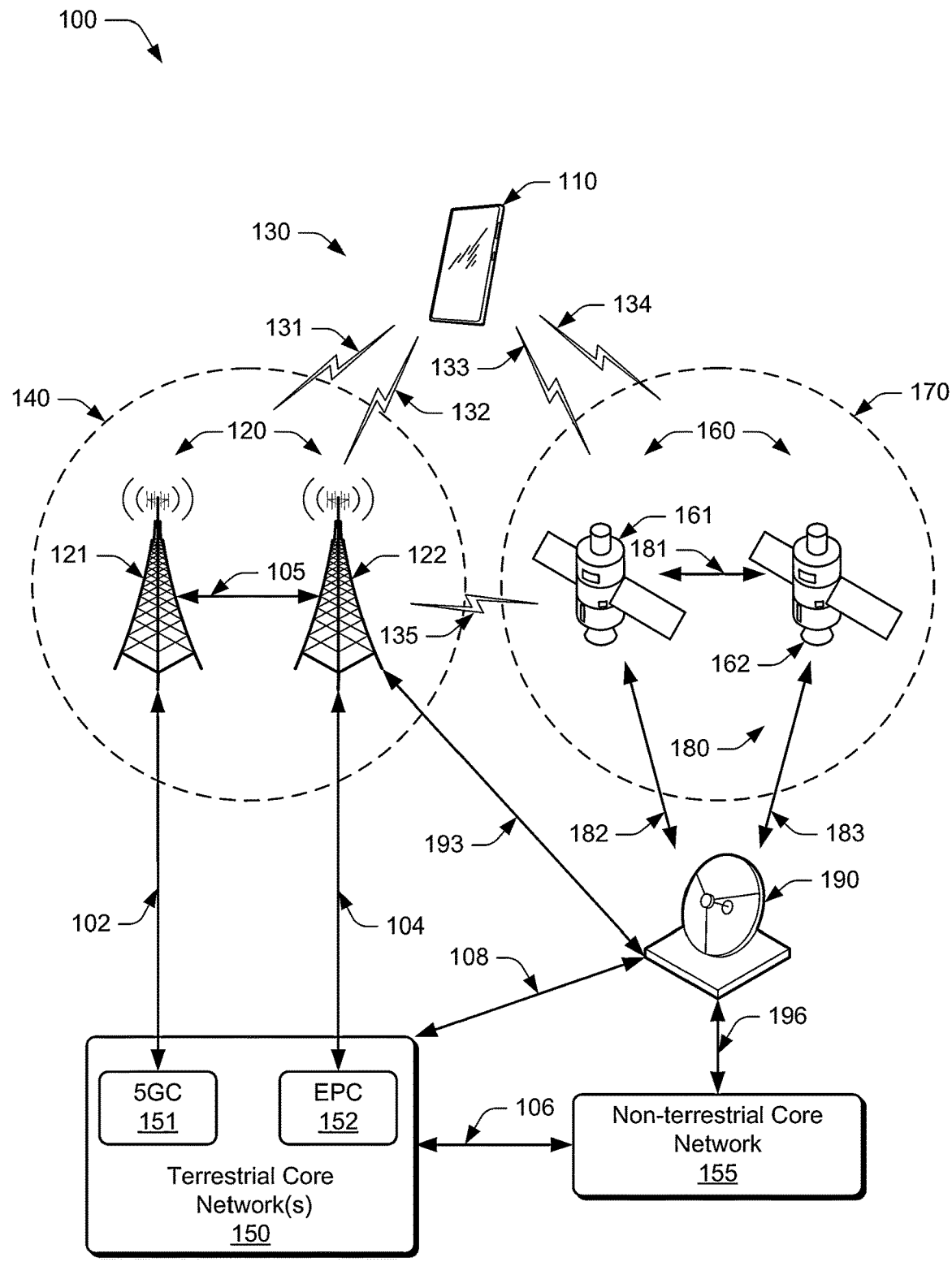
FIG. 1 illustrates an example environment that can be used in accordance with various aspects of flexible frequency band pairing for satellite communications.

User equipment (UE) communications with non-terrestrial communication systems (e.g., satellite communication systems) pose several challenges for UE mobility. As one example, satellite communications experience large propagation loss due to any combination of free-space path loss, absorption, obstacles, fading, and so forth, which result in poor signal quality at a receiver and, subsequently, poor performance (e.g., increased bit errors, decreased reliability) at a UE. As another example, regulatory bodies, such as the Federal Communications Commission (FCC) and/or the International Telecommunication Union (ITU), enforce rules for using portions of the frequency spectrum. To illustrate, the regulatory bodies may enforce different power spectral density limitations for various frequency bands (defined by the regulatory bodies) that impact wireless communications between a satellite to a user equipment (UE). As one example, the power spectral density limitation may result in low signal-to-noise ratios (SNR) in downlink communications that result in poor signal quality at the receiver, such as when a UE operates at the edge of a cell.

To improve a signal quality of transmissions used in satellite-based communications, a non-terrestrial communication system uses multiple frequency bands for a wireless link between a UE and a satellite operating within the non-terrestrial communication system. As one example, a ground station and/or satellite operating within the non-terrestrial communication system selects a first defined frequency band (e.g., defined by a regulatory body and/or committee) for downlink communications from the satellite to the UE and a second defined frequency band (e.g., defined by the regulatory body and/or committee) for uplink communications from the UE to the satellite, where the first defined frequency band and the second defined frequency band are different from one another. The defined frequency bands may correspond to frequency bands defined and/or regulated by a variety of entities, such as government-defined frequency bands, committee-defined frequency bands, standards-defined frequency bands (e.g., Fifth-Generation New Radio (5G NR)-defined frequency bands, Third Generation Partnership Project Long-Term Evolution (3GPP LTE), Mobile Satellite Service (MSS)), ITU-defined frequency bands, FCC-defined frequency bands, European Union (EU)-defined frequency bands, Institute of Electrical and Electronics Engineers (IEEE)-defined frequency bands, military-defined frequency bands, North Atlantic Treaty Organization (NATO)-defined frequency bands, industrial, scientific, and medical (ISM)-defined frequency bands, spectrum licensing authority-defined bands (e.g., Office of Communications (OFCOM)-defined bands in the United Kingdom (UK), and similar licensing authorities in other countries) and so forth. In some aspects, the non-terrestrial communication system selects the two different frequency bands based on receiving UE-requested frequency-band-pairing settings from the UE, where the UE-requested frequency-band-pairing settings indicate requested frequency band pairs. The non-terrestrial communication system then directs the satellite and the UE to communicate via the wireless link using the first defined frequency band for the downlink communications and the second defined frequency band for the uplink communications.

In aspects, the non-terrestrial communication system and/or the UE select the different frequency bands based on power spectral density limitations. To illustrate, the non-terrestrial communication system and/or the UE select, for the downlink communications, a first defined frequency band that has a higher power spectral density limitation relative to a second defined frequency band used for uplink communications. The different power spectral density limitations allow the satellite to increase a power level of a downlink transmission (relative to downlink transmissions in a same frequency band as uplink transmissions) to the UE. This improves a received signal quality at the UE, even when the UE is located at an edge of coverage, which improves system performance by decreasing bit errors and increasing communication reliability.

While features and concepts of the described systems and methods for flexible frequency band pairing for satellite communications can be implemented in any number of different environments, systems, devices, and/or various configurations, various aspects of flexible frequency band pairing for satellite communications are described in the context of the following example devices, systems, and configurations.

Operating Environment

FIG. 1 illustrates an example environment 100, which includes a user equipment 110 (UE 110) that can communicate with terrestrial base stations 120 (illustrated as terrestrial base stations 121 and 122) through one or more wireless links 130 (wireless links 130), generally illustrated as wireless link 131 and wireless link 132. Alternatively, or additionally, the UE 110 can communicate with one or more non-terrestrial communication platforms, illustrated as satellite(s) 160 (e.g., satellite 161 and satellite 162) through one or more of the wireless links 130, generally illustrated as wireless link 133 and wireless link 134. In some aspects, the non-terrestrial communication platform can provide ubiquitous coverage for UE communications using non-terrestrial flying or floating communication platforms (e.g., satellite communication systems, an airborne vehicle platform, aircraft-based communication platforms, drone-based communication platforms). One of these non-terrestrial flying or floating communication platforms may be referred to as a High Altitude Platform Station (HAPS).

For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The terrestrial base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station, and the like, or any combination thereof.

The terrestrial base stations 120 communicate with the UE 110 using the wireless links 131 and/or 132, which may be implemented as any suitable type of wireless link. Similarly, the satellites 160 communicate with the UE 110 using the wireless links 133 and/or 134. At times, the terrestrial base stations 120 communicate with the satellites 160 using the wireless link 135. The wireless links 131, 132, 133, 134, and/or 135 include control-plane signaling and/or user-plane data, such as downlink of user-plane data and control-plane information communicated from the terrestrial base stations 120 to the UE 110, downlink of user-plane data and control-plane information from the satellites 160 to the UE 110, uplink of other user-plane data and control-plane information communicated from the UE 110 to the terrestrial base stations 120, uplink of other user-plane data and control-plane signaling communicated from the UE 110 to the satellites 160, downlink and uplink communications between abase station and a satellite, or any combination thereof. The wireless links 130 may include one or more wireless links (e.g., radio links) or bearers implemented using any suitable communication protocol or standard, or combination of communication protocols or standards, such as Third Generation Partnership Project Long-Term Evolution (3GPP LTE), Fifth Generation New Radio (5G NR), Mobile Satellite Service (MSS), and so forth. Multiple wireless links 130 may be aggregated in a carrier aggregation or multi-connectivity technology to provide a higher data rate for the UE 110. Multiple wireless links 130 from multiple terrestrial base stations 120 may be configured for Coordinated Multipoint (CoMP) or Dual Connectivity (DC) communication with the UE 110.

The terrestrial base stations 120 form a first wireless communication network, such as a Radio Access Network 140 (e.g., RAN, Evolved Universal Terrestrial Radio Access Network, E-UTRAN, 5G NR RAN, NR RAN), where the RAN 140 communicates with one or more terrestrial core networks 150 (core network 150). To illustrate, the terrestrial base station 121 connects, at interface 102, to a 5G core network 151 (5GC 151)) through an NG2 interface for control-plane signaling and using an NG3 interface for user-plane data communications. The terrestrial base station 122 connects, at interface 104, to an Evolved Packet Core 152 (EPC 152) using an S1 interface for control-plane signaling and user-plane data communications. Alternatively, or additionally, the terrestrial base station 122 connects to the 5GC 151 using an NG2 interface for control-plane signaling and through an NG3 interface for user-plane data communications (not illustrated). Accordingly, certain terrestrial base stations 120 can communicate with multiple wireless core networks 150 (e.g., 5GC 151, the EPC 152).

In addition to connections with core networks, the terrestrial base stations 120 may communicate with each other. For example, the terrestrial base stations 121 and 122 communicate through an Xn interface at interface 105. In some aspects, a terrestrial base station 120 coordinates with a satellite 160 through the wireless link 135 and/or through the connection to the terrestrial core network 150. As another example, a terrestrial core network 150 coordinates with a non-terrestrial core network 155 through an interface 106 as further described.

The satellites 160 form a second wireless communication network, generally labeled in the environment 100 as a satellite access network 170 (SAN 170). The SAN 170 can alternatively or additionally be referred to as a satellite communication system. In aspects, the UE 110 communicates with the satellites using the wireless links 133 and/or 134 that can be implemented using a common radio-access technology (RAT) used to communicate with the terrestrial base stations 120 and/or a satellite RAT different from RATs used to communicate with the terrestrial base stations 120. As one example, the RAT used to communicate with the satellites 160 may operate in accordance with frequencies and protocols that might be associated with a Mobile Satellite Service (MSS) or the like. Alternatively or additionally, the UE 110 communicates with the satellites 160 using one or more RATs used to communicate with the terrestrial base stations 120, such as LTE, 5G NR, 6G communications, and so forth.

Generally, the satellite 161 and satellite 162 represent non-terrestrial communication platforms and may be, for example, a low earth orbit (LEO) satellite, a medium earth orbit (MEO) satellite, or a geostationary earth orbit (GEO) satellite. The satellite 161 and the satellite 162 can include on-board processing to implement base station functionality (e.g., a gNode B, a Distributed Unit (DU)) and/or implement a bent pipe architecture in which the satellite acts as a transponder relay. The satellite 161 and the satellite 162 communicate with elements of the SAN 170 by way of one or more interfaces 180 (illustrated as interface 181, interface 182, and interface 183). Interface 181 supports an inter-satellite link (ISL) connecting satellite 161 and satellite 162 and may be, for example, an optical interface, a laser interface, or a radio frequency (RF) interface. Interfaces 182 and 183 support gateway links (GWLs) connecting satellite 161 and satellite 162, respectively, to a non-terrestrial core network 155, such as through one or more satellite ground stations 190 (e.g., a ground radio unit, remote radio units (RRUs)) and interface 196. The non-terrestrial core network 155 can include and/or communicate with any combination of ground stations (e.g., satellite ground stations 190), servers, routers, switches, control elements, and the like. The ground station 190 can alternatively or additionally be referred to as a non-terrestrial base station. As shown, the non-terrestrial core network 155 communicates with the terrestrial core network 150 through an interface 106 and the ground station 190 through the interface 196 (e.g., N1, N2, and/or N3 interface). In different configurations, however, a satellite ground station 190 may connect to a terrestrial core network through interface 108 (e.g., N1, N2, and/or N3 interface) or to a base station 120 through a different interface 193 (illustrated generally in FIG. 1 as an interface to base station 122).

Example Devices

Figure 2:
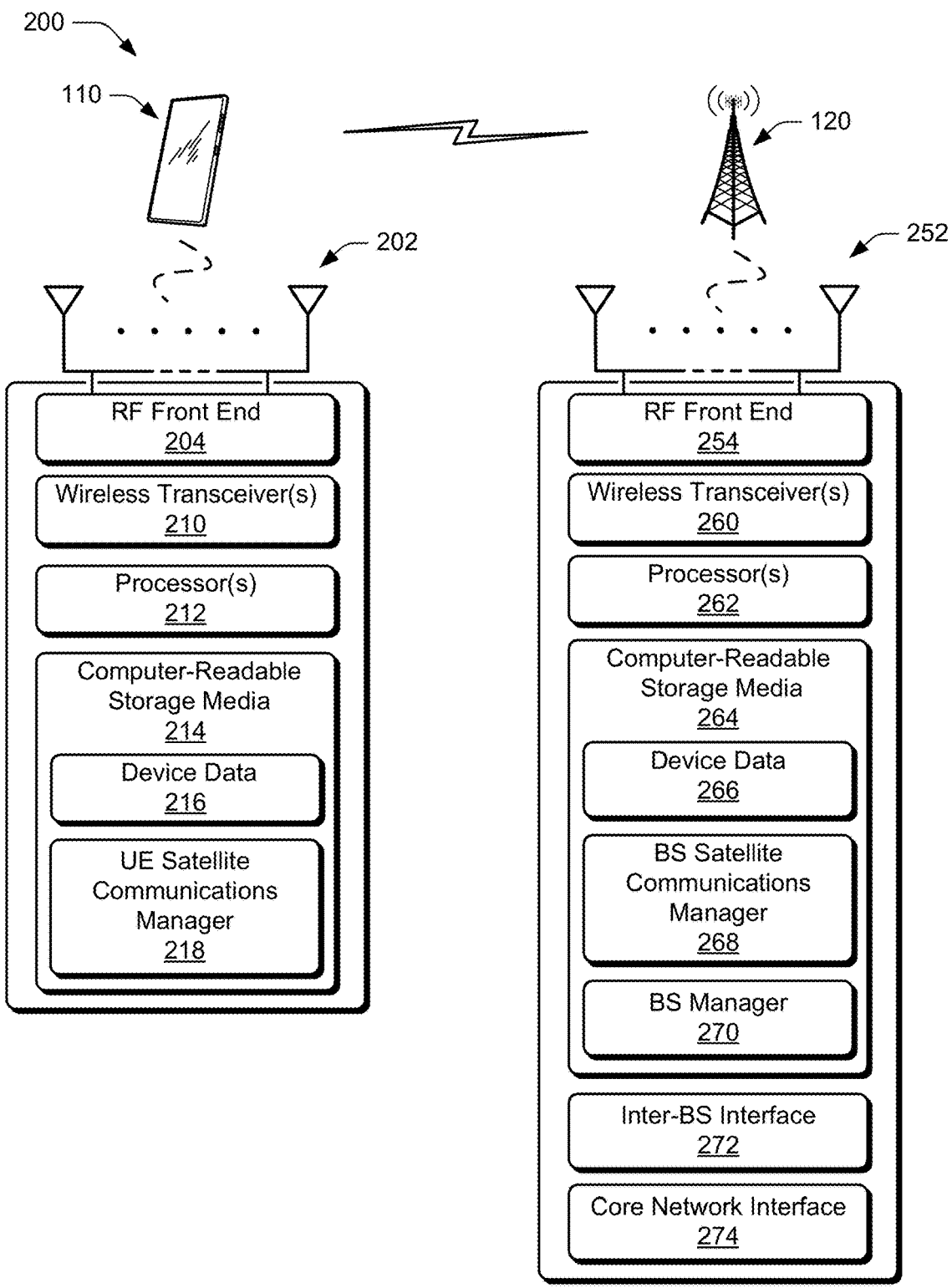
FIG. 2 illustrates an example device diagram of entities that can implement various aspects of flexible frequency band pairing for satellite communications.

FIG. 2 illustrates an example device diagram 200 of the UE 110 and one of the base stations 120 that can implement various aspects of flexible frequency band pairing for satellite communications. The UE 110 and/or the base station 120 may include additional functions and interfaces that are omitted from FIG. 2 for the sake of clarity.

The UE 110 includes antennas 202, a radio frequency front end 204 (RF front end 204), and one or more wireless transceivers 210 (e.g., an LTE transceiver, a 5G NR transceiver, and/or a 6G transceiver) for communicating with the base station 120 in the RAN 140 and/or the satellite 160 in the SAN 170. The RF front end 204 of the UE 110 can couple or connect the wireless transceivers 210 to the antennas 202 to facilitate various types of wireless communication. The antennas 202 of the UE 110 may include an array of multiple antennas that are configured in a similar manner to, or different manner from, each other. The antennas 202 and the RF front end 204 can be tuned to, and/or be tunable to, one or more frequency bands defined by the 3GPP LTE, 5G NR, 6G communication standards, and/or various satellite frequency bands, such as the L-band (1-2 Gigahertz (GHz)), the S-band (2-4 GHz), the C-band (4-8 GHz), the X-band (8-12 GHz), the Ku-band (12-18 GHz), K-band (18-27 GHz), and/or the Ka-band (27-40 GHz), and implemented by the wireless transceiver 210. In some aspects, the satellite frequency bands overlap with the 3GPP LTE-defined, 5G NR-defined, and/or 6G-defined frequency bands. Additionally, the antennas 202, the RF front end 204, and/or the wireless transceiver 210 may be configured to support beamforming for the transmission and reception of communications with the base station 120 and/or the satellite 160. By way of example and not limitation, the antennas 202 and the RF front end 204 can be implemented for operation in sub-gigahertz (GHz) bands, sub-6 GHz bands, and/or above 6 GHz bands that are defined by the 3GPP LTE, 5GNR, 6G, and/or satellite communications (e.g., satellite frequency bands).

The UE 110 also includes processor(s) 212 and computer-readable storage media 214 (CRM 214). The processor 212 may be a single-core processor or a multiple-core processor composed of a variety of materials, for example, silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the UE 110. The device data 216 can include user data, sensor data, control data, automation data, multimedia data, beamforming codebooks, applications, and/or an operating system of the UE 110, some of which are executable by processor(s) 212 to enable user-plane data, control-plane information, and user interaction with the UE 110.

The CRM 214 of the UE 110 includes a user equipment satellite communications manager 218 (UE satellite communications manager 218). The UE satellite communications manager 218 may be implemented in whole or part as hardware logic or circuitry integrated with or separate from other components of the UE 110. While shown as a singular module in diagram 200, some implementations include a portion or all functionality provided by the UE satellite communications manager 218 within a UE protocol stack (not shown in FIG. 2). In some aspects, the UE satellite communications manager 218 manages some or all UE-side aspects of UE-side aspects of flexible frequency band pairing as described herein.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Radio Unit (RU), Remote Radio Head (RRH), and/or Remote Radio Unit (RRU). The base station 120 includes antennas 252, a radio frequency front end 254 (RF front end 254), one or more wireless transceivers 260 (e.g., one or more LTE transceivers, one or more 5G NR transceivers, and/or one or more 6G transceivers) for communicating with the UE 110 and/or the satellite 160. The RF front end 254 of the base station 120 can couple or connect the wireless transceivers 260 to the antennas 252 to facilitate various types of wireless communication. The antennas 252 of the base station 120 may include an array of multiple antennas that are configured in a similar manner to, or different manner from, each other. The antennas 252 and the RF front end 254 can be tuned to, and/or be tunable to, one or more frequency bands defined by the 3GPP LTE, 5G NR, 6G communication standards, and/or various satellite frequency bands, and implemented by the wireless transceivers 260. Additionally, the antennas 252, the RF front end 254, and the wireless transceivers 260 may be configured to support beamforming (e.g., Massive multiple-input, multiple-output (Massive-MIMO)) for the transmission and reception of communications with the UE 110 and/or the satellite 160.

The base station 120 also includes processor(s) 262 and computer-readable storage media 264 (CRM 264). The processor 262 may be a single-core processor or a multiple-core processor composed of a variety of materials, for example, silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base station 120. The device data 266 can include network scheduling data, radio resource management data, beamforming codebooks, applications, and/or an operating system of the base station 120, which are executable by processor(s) 262 to enable communication with the UE 110 and/or the satellite 160.

The CRM 264 optionally includes a base station satellite communications manager 268 (BS satellite communications manager 268). The BS satellite communications manager 268 may be implemented in whole or part as hardware logic or circuitry integrated with or separate from other components of the base station 120. While shown as a singular module in the diagram 200, some implementations include a portion of, or all, functionality provided by the BS satellite communications manager 268 within a BS protocol stack (not shown in FIG. 2). In some aspects, the BS satellite communications manager 268 manages communications and/or coordination with non-terrestrial communication systems, such as flexible frequency band assignment as described with reference to FIGS. 5 and 6.

The CRM 264 of the base station 120 also includes a base station manager 270 (BS manager 270), which may control various functionalities of the base station 120. Alternatively or additionally, the BS manager 270 may be implemented in whole or in part as hardware logic or circuitry integrated with, or separate from, other components of the base station 120. In at least some aspects, the BS manager 270 configures the wireless transceivers 260 for communication with the UE 110, the satellite 160, and/or core network(s) (e.g., the terrestrial core network 150, the non-terrestrial core network 155). The base station 120 also includes an inter-base station interface 272, such as an Xn and/or X2 interface, which the base station manager configures to exchange user-plane data, control-plane information, and/or other data/information between other base stations, to manage the communication of the base station 120 with the UE 110 and/or the satellite 160. The base station 120 includes a core network interface 274 that the base station manager 270 configures to exchange user-plane data, control-plane information, and/or other data/information with core network functions and/or entities.

Figure 3:
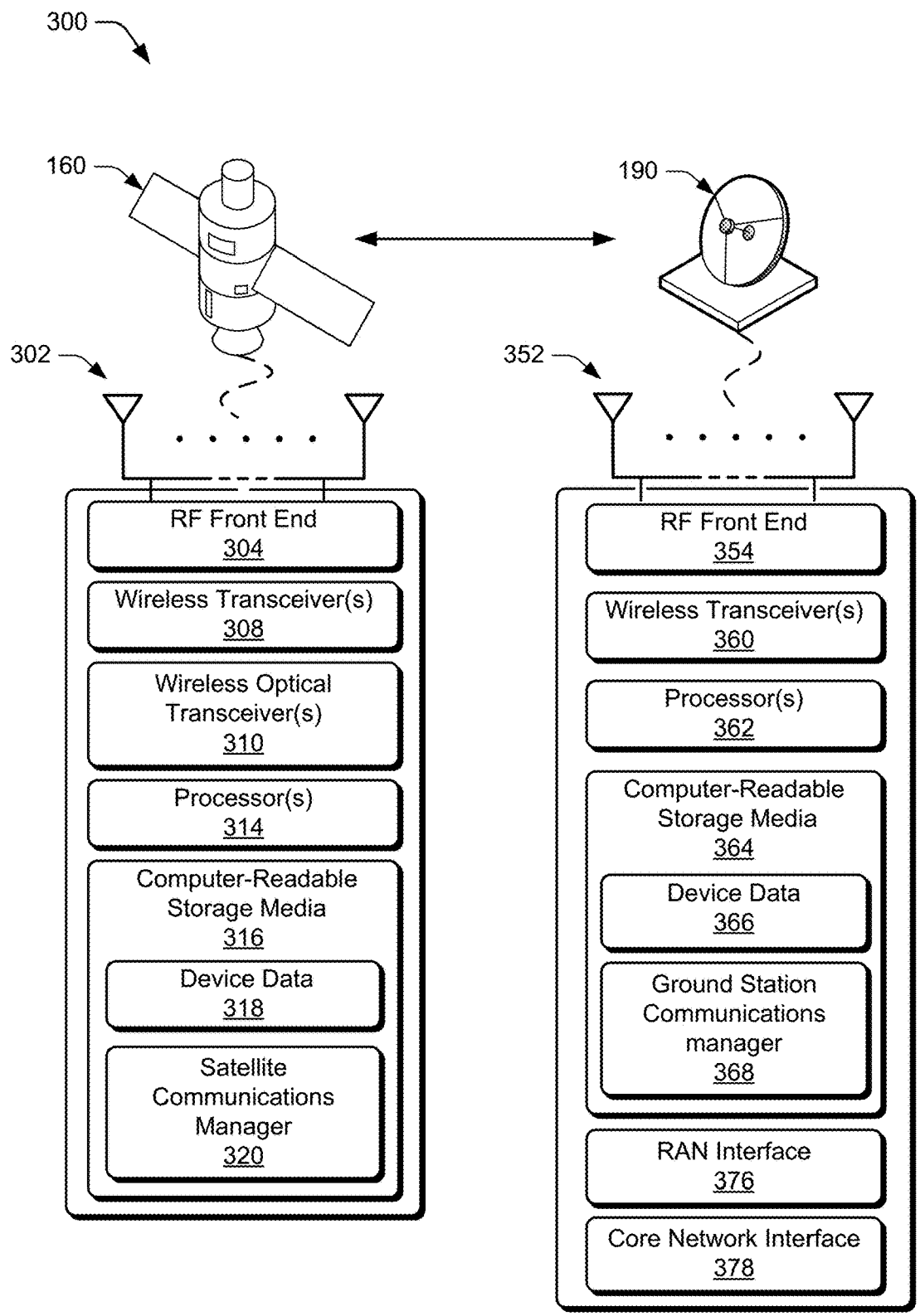
FIG. 3 illustrates an example device diagram of entities that can be used in accordance with one or more aspects of flexible frequency band pairing for satellite communications.

FIG. 3 illustrates an example device diagram 300 of the satellite 160 and the ground station 190 (alternately a non-terrestrial base station) that can implement various aspects of flexible frequency band pairing for satellite communications. The satellite 160 and the ground station 190 may include additional functions and interfaces that are omitted from FIG. 3 for the sake of visual clarity.

The satellite 160 can include on-board processing to implement a single network node (e.g., a gNode B). Alternatively or additionally, the satellite 160 implements distributed base station functionality, such as a Distributed Unit (DU), that communicates with a Central Unit (CU) at the ground station 190. In some aspects, the satellite 160 implements a bent pipe architecture in which the satellite acts as a transponder relay. The satellite 160 includes one or more antenna(s) 302, a radio frequency front end 304 (RF front end 304), and one or more wireless transceivers 306 for wirelessly communicating with the base station 120, the UE 110, another satellite 160, and/or the ground station 190.

The antenna(s) 302 of the satellite 160 may include an array of multiple antennas that are configured in a similar manner to, or different manner from, each other. Additionally, the antennas 302, the RF front end 304, and the transceiver(s) 306 may be configured to support beamforming for the transmission and reception of communications with the base stations 120, the UE 110, another satellite 160, and/or the non-terrestrial core network 155. By way of example and not limitation, the antennas 302 and the RF front end 304 can be implemented for operation in sub-gigahertz bands, sub-6 GHz bands, and/or above 6 GHz bands. To illustrate, the antennas 302 and the RF front end 304 can be implemented for operation in any combination of satellite frequency bands (e.g., L-band, S-band, C-band, X-band, Ku-band, K-band, Ka-band). Thus, the antenna 302, the RF front end 304, and the transceiver(s) 306 provide the satellite 160 with an ability to receive and/or transmit communications with the base station 120, the UE 110, another satellite 160, and/or the non-terrestrial core network 155.

The satellite 160 optionally includes one or more wireless optical transceiver 310 (wireless optical transceiver(s) 310) that can be used to communicate with other devices. To illustrate, a first instance of the satellite 160 communicates with a second instance of the satellite 160 using the wireless optical transceiver 310 as part of the interface 181.

The satellite 160 includes processor(s) 314 and computer-readable storage media 316 (CRM 316). The processor 314 may be a single-core processor or a multiple-core processor implemented with a homogenous or heterogeneous core-structure. The computer-readable storage media described herein excludes propagating signals. CRM 316 may include any suitable memory or storage device such as RAM, SRAM, DRAM, NVRAM, ROM, or Flash memory useable to store device data 318 of the satellite 160. The device data 318 includes user data, multimedia data, applications, and/or an operating system of the satellite 160, which are executable by processor(s) 314 to enable various aspects of flexible frequency band pairing for satellite communications as further described.

The CRM 316 includes a satellite communications manager 320. The satellite communications manager 320 may be implemented in whole or part as hardware logic or circuitry integrated with or separate from other components of the satellite 160. While shown as a singular module in the diagram 300, some implementations include a portion of, or all, functionality provided by the satellite communications manager 320 within a satellite protocol stack (not shown in FIG. 3). In some aspects, the satellite communications manager 320 manages aspects of flexible frequency band pairing for satellite communications, such as flexible frequency band assignment as described with reference to FIGS. 5 and 6.

The device diagram for the ground station 190, shown in FIG. 3, can implement a single network node (e.g., a gNode B). At times, the functionality of the ground station 190 may be distributed across multiple network nodes or devices and may be distributed in any fashion suitable to perform the functions described herein. The nomenclature for this distributed base station functionality varies and includes terms such as Central Unit (CU), Distributed Unit (DU), Baseband Unit (BBU), Radio Unit (RU), Remote Radio Head (RRH), and/or Remote Radio Unit (RRU). The ground station 190 includes antennas 352, a radio frequency front end 354 (RF front end 354), one or more wireless transceivers 360 (e.g., one or more LTE transceivers, one or more 5G NR transceivers, and/or one or more 6G transceivers) for communicating with the satellite 160. The RF front end 354 of the ground station 190 can couple or connect the wireless transceivers 360 to the antennas 352 to facilitate various types of wireless communication. The antennas 352 of the ground station 190 may include an array of multiple antennas that are configured in a manner similar to, or different from, each other. The antennas 352 and the RF front end 354 can be tuned to, and/or be tunable to, one or more satellite frequency bands and/or frequency bands defined by the 3GPP LTE, 5GNR, 6G communication standards, and/or various satellite frequency bands, and implemented by the wireless transceivers 360. Additionally, the antennas 352, the RF front end 354, the wireless transceivers 360 may be configured to support beamforming (e.g., Massive multiple-input, multiple-output (Massive-MIMO)) for the transmission and reception of communications with the satellite 160.

The ground station 190 also includes processor(s) 362 and computer-readable storage media 364 (CRM 364). The processor 362 may be a single-core processor or a multiple-core processor composed of a variety of materials, for example, silicon, polysilicon, high-K dielectric, copper, and so on. CRM 364 may include any suitable memory or storage device such as random-access memory (RAM), static RAM (SRAM), dynamic RAM (DRAM), non-volatile RAM (NVRAM), read-only memory (ROM), or Flash memory useable to store device data 366 of the ground station 190. The device data 366 include network scheduling data, radio resource management data, beamforming code-books, applications, frequency band pairing configurations, and/or an operating system of the ground station 190, which are executable by processor(s) 362 to enable communication with the satellite 160.

The CRM 364 includes a ground station communications manager 368. The ground station communications manager 368 may be implemented in whole or part as hardware logic or circuitry integrated with or separate from other components of the ground station 190. While shown as a singular module in the diagram 300, some implementations include a portion of, or all, functionality provided by the ground station communications manager 368 within a ground station protocol stack (not shown in FIG. 3). In some aspects, the ground station communications manager 368 manages aspects of flexible frequency band pairing for satellite communications, such as flexible frequency band assignment as described with reference to FIGS. 5 and 6.

The ground station 190 may include a radio access network interface 376 (RAN interface 376) to implement interface 193 to one or more of the base stations 120. In aspects, the RAN interface 376 is analogous to an Xn or X2 interface between terrestrial base stations. The ground station may also include a core network interface 378 to implement interface 196 or 108 that enables the ground station to communicate with the core network of the non-terrestrial network or satellite communication network or communicate with a terrestrial core network.

Regulated and/or Defined Frequency Bands

To communicate in a wireless network, a first device transmits a wireless signal to a second device in accordance with various rules and/or standards adopted by the wireless network. By conforming to the rules and/or standards, the various devices operating in the wireless network can share air interface resources (e.g., spectrum) not only with other devices operating in the wireless network, but with other technologies that utilize the frequency spectrum as well. To illustrate, following the rules and/or standards prevents transmission collisions and improves the reliability of a receiving device successfully recovering information and/or data included in the transmission.

Various governing bodies and/or committees (referred to herein as governing entities) help contribute to the rules used to allocate access to a frequency spectrum, such as a wireless communication standards committee (e.g., a 3GPP standards committee, 3GPP 5G NR standards committee, 3GPP LTE standards committee, MSS standards committee), a national-, regional-, and/or federal-level regulating body (e.g., the FCC, the ITU, the EU, OFCOM), a manufacturer (e.g., a base station manufacturer, a mobile phone manufacturer), other governing entities (e.g., IEEE, NATO, ISM), and so forth. In aspects, these various governing entities contribute to how a wireless network, and subsequently devices operating in the wireless network, access the frequency spectrum.

Figure 4:
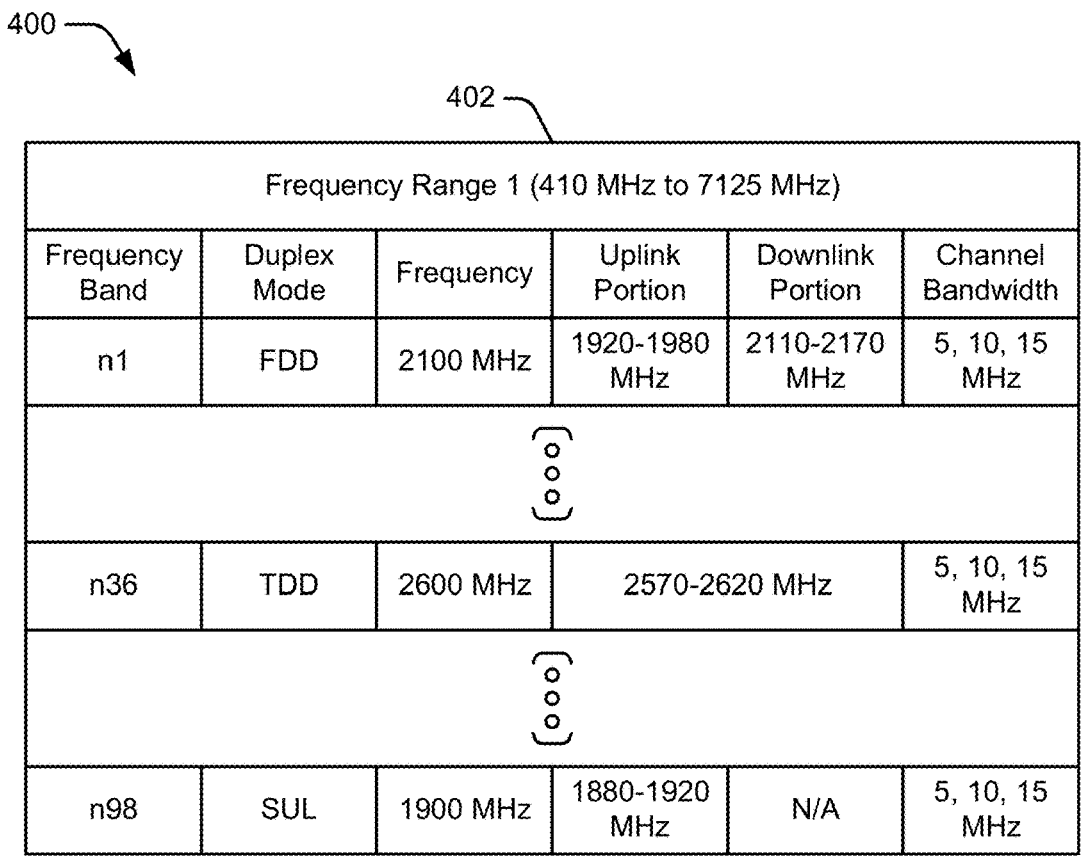
FIG. 4 illustrates an example of defined and/or regulated frequency bands in accordance with one or more aspects of flexible frequency band pairing for satellite communications.
Figure 4:
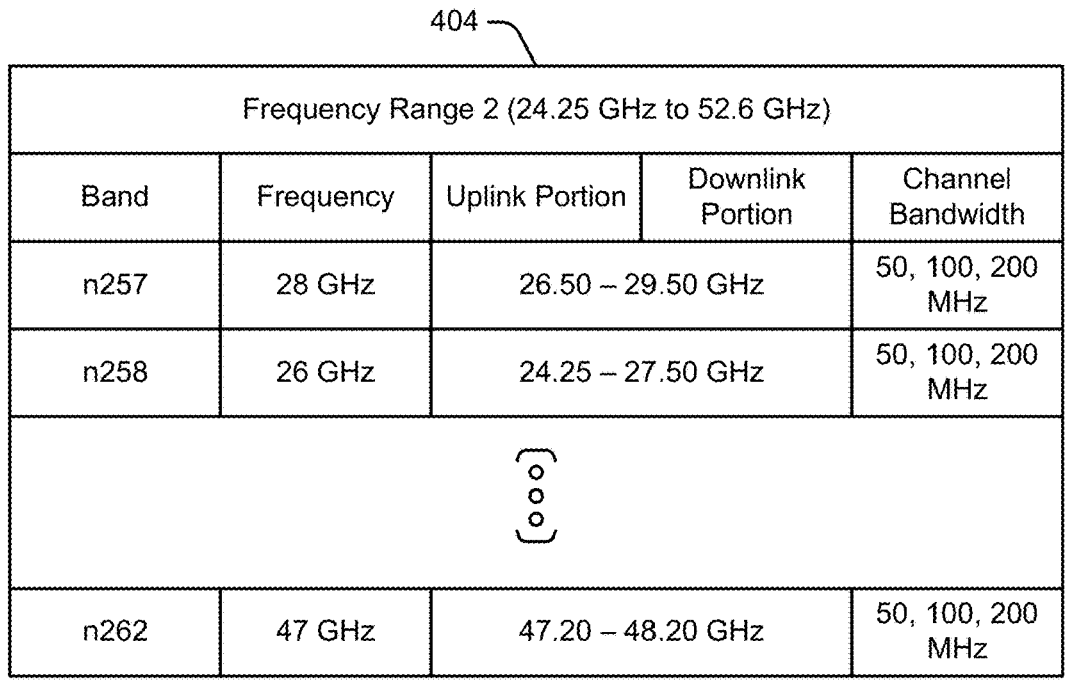

FIG. 4 illustrates an example 400 of a defined and/or regulated frequency spectrum in accordance with one or more aspects of flexible frequency band pairing for satellite communications. FIG. 4 includes a first table 402 that shows a first example of a defined and/or regulated frequency range (i.e., frequency range 1) that spans 410 MHz to 7125 MHz and a second table 404 that shows a second example of a defined and/or regulated frequency range (i.e., frequency range 2) that spans 24.25 GHz to 52.6 GHz. In other implementations, the defined and/or regulated frequency ranges span alternative or additional frequencies. Similar to a defined and/or regulated frequency band (generally referred to as a defined frequency band), a defined and/or regulated frequency range corresponds to a range of frequencies defined and/or regulated by one or more governing entities, such as government-defined frequency ranges, committee-defined frequency ranges, standards-defined frequency ranges (e.g., 5G NR-defined frequency ranges, 3GPP LTE-defined frequency ranges, MSS-defined frequency ranges), ITU-defined frequency ranges, FCC-defined frequency ranges, EU-defined frequency ranges, IEEE-defined frequency ranges, military-defined frequency ranges, NATO-defined frequency ranges, ISM-defined frequency ranges, and so forth. Each defined and/or regulated frequency range (generally referred to as a defined frequency range) shown by the table 402 and table 404 includes one or more frequency bands also defined and/or regulated by the one or more governing entities. In aspects, a defined frequency band is a portion (or sub-range) of a defined frequency range.

In aspects, multiple governing entities contribute to the various properties and/or characteristics that describe a defined frequency range and/or defined frequency band. As one example, assume a first governing entity (e.g., the ITU) defines worldwide regions for using the frequency spectrum such that each worldwide region governs how the respective region uses the frequency spectrum. A second governing entity (e.g., the FCC) may then define or allocate portions of the frequency spectrum on a regional basis (e.g., within a particular region) to different technologies. To illustrate, the FCC allocates a first portion of the frequency spectrum to cellular communications within the United States, a second portion of the frequency spectrum to satellite communications within the United States, a third portion of the frequency spectrum for television broadcasts within the United States, and so forth. A third governing entity (e.g., a 3GPP 5G NR standards committee) may then generate rules and/or standards for how various devices (e.g., a base station, a UE, a satellite) use the portion of frequency spectrum allocated for a respective technology.

Table 402 includes defined frequency bands that correspond to frequency partitions within the frequency range 1 (FR1). Table 402 also provides example usage rules defined for each frequency band, shown in FIG. 4 as: a duplex mode (e.g., a frequency division duplex (FDD) mode, a time division duplex (TDD) mode, a supplementary uplink (SUL) mode, a supplementary downlink (SDL) mode), a frequency identifier and/or alias for the defined frequency band, uplink allocations within the defined frequency band (e.g., uplink portion), downlink allocations within the defined frequency band (e.g., downlink portion), and allowed channel bandwidths. The usage rules shown in table 402 can include additional usage rules which are not shown in FIG. 4 for the sake of visual brevity.

To further illustrate the usage rules, assume that a base station directs a UE operating in a wireless network to transmit and/or receive signals in a first (defined) frequency band, labeled in the table 402 as "n1", that has a frequency identifier and/or alias of 2100 MHz. To use the frequency band "n1" in conformance with the usage rules shown by table 402, the base station and the UE communicate with one another using FDD transmissions. In other words, one or more governing entities classify and/or define a duplex mode of the "n1" frequency band as an FDD duplex mode for accessing the "n1" frequency band, and the base station and the UE conform to this usage rule by communicating with one another only using FDD transmissions. More particularly, and as shown by the table 402, this corresponds to using the 1920-1980 MHz frequency range for uplink transmissions and the 2110-2170 MHz for downlink transmissions, where the uplink and/or downlink transmissions may use a channel bandwidth of 5 MHz, 10 MHz, or 15 MHz. Here, the one or more governing entities that define and/or regulate the "n1" frequency band also classify and/or define the "n1" frequency band as a bidirectional frequency band that supports bidirectional communications (e.g., both uplink transmissions and downlink transmissions) using partitioned access to the "n1" frequency band (e.g., an FDD bidirectional frequency band). Accordingly, for the "n1" frequency band, the partitioned access corresponds to a FDD duplex mode (e.g., a government-defined duplex mode, a standards-defined duplex mode, a committee-defined duplex mode) that uses a first portion of the "n1" frequency band for uplink transmissions (as shown by the usage rules) and a second portion of the "n1" frequency band for downlink transmissions (as shown by the usage rules).

As another example of usage rules, assume that the base station directs the UE operating in the wireless network to transmit and/or receive signals in a second (defined) frequency band, labeled in the table 402 as "n36", that has a frequency identifier and/or alias of 2600 MHz. To use the "n36" frequency band in conformance with the usage rules shown by table 402, the base station and the UE communicate with one another using partitioned access in time (e.g., TDD), where the uplink and/or downlink transmissions may use a channel bandwidth of 5 MHz, 10 MHz, or 15 MHz. In other words, one or more governing entities classify and/or define a duplex mode of the "n36" frequency band as an TDD duplex mode for accessing the "n36" frequency band, and the base station and the UE conform to this usage rule by communicating with one another only using TDD transmissions. Although not shown in the table 402, the usage rules specified by a governing entity may specify time-partitioning usage rules that indicate which time divisions may be used for uplink communications and which time divisions may be used for downlink communications. Accordingly, the one or more governing entities that define and/or regulate the "n36" frequency band also classify and/or define the "n36" frequency band as a bidirectional frequency band that supports bidirectional communications (e.g., both uplink transmissions and downlink transmissions) using TDD (e.g., a TDD bidirectional frequency band).

In some aspects, a governing entity may define a frequency band as a unidirectional frequency band that only supports downlink communications or only supports uplink communications. For instance, one or more governing entities define and/or regulate a third frequency band labeled as "n98" in the table 402 (with a frequency identifier and/or alias of 1900 MHz), and classify the "n98" frequency band as a unidirectional frequency band for supplementary uplink communications. Accordingly, to be in conformance with the usage rules as shown in the table 402, a device transmitting in the "n98" frequency band only transmits uplink communications that use a channel bandwidth of 5 MHz, 10 MHz, or 15 MHz. The channel bandwidths shown in the table 402 can include alternative or additional bandwidths (not shown in FIG. 4) for each defined frequency band. While not shown in the table 402, alternative or additional frequency bands may be classified and/or defined (e.g., by a governing entity) as unidirectional frequency bands for supplementary downlink (SDL) communications.

In a similar manner as the table 402, the table 404 shows usage rules (as defined by one or more governing entities) for using one or more defined frequency bands within the frequency range 2 (FR2). Each defined frequency band shown in the table 404 corresponds to a portion of the frequency spectrum allocated to frequency range 2. For example, a first (defined) frequency band of the frequency range 2, labeled as "n257" in the table 404, corresponds to a first portion of the frequency range 2, and is defined as 26.50-29.50 GHz and has an alias of 28 MHz. The usage rules shown by table 404 also indicate that the "n257" frequency band corresponds to a bidirectional frequency band for uplink and/or downlink transmissions that use a channel bandwidth of 50 MHz, 100 MHz, or 200 MHz. Similarly, a second (defined) frequency band, labeled as "n258", corresponds to a second portion of the frequency range 2, and a third (defined) frequency band, labeled as "n262", corresponds to a third portion of the frequency range 2. As shown in the table 404, the usage rules for the "n258" frequency band and the "n262" frequency band indicate that each frequency band corresponds to a bidirectional frequency band for uplink and/or downlink transmissions that use a channel bandwidth of 50 MHz, 100 MHz, or 200 MHz.

Defined frequency ranges and/or defined frequency bands provide usage rules for accessing a frequency spectrum. By following these usage rules, various wireless networks and/or devices can share the frequency spectrum in a manner that prevents transmission collisions and improves the reliability of a receiving device successfully recovering information and/or data included in the transmission. In some cases, these access rules include the different power spectral density limitations for the various defined frequency bands, which may result in low SNR in downlink communications that result in poor signal quality at the receiver. To improve a signal quality of transmissions used in satellite-based communications, a non-terrestrial communication system uses multiple frequency bands for a wireless link between a UE and a satellite operating within the non-terrestrial communication system, such as defined frequency bands that allow the satellite to increase a power level of a downlink transmission (relative to downlink transmissions in a same frequency band as uplink transmissions) to the UE. This improves a received signal quality at the UE, even when the UE is located at an edge of coverage, which improves system performance by decreasing bit errors and increasing communication reliability.

Flexible Frequency Band Pairing for Satellite Communications

Satellite communication systems typically face many challenges, such as low SNR due to large propagation loss. As another challenge, regulatory power spectral density limitations can severely limit or impair a downlink SNR, such as when a UE operates at a cell edge. To address this and other issues, aspects of flexible frequency band pairing for satellite communications enable a non-terrestrial communication system to use multiple defined frequency bands for implementing a wireless link between a UE and a satellite. As one example, the non-terrestrial communication system uses a first defined frequency band for downlink (DL) communications, and a second defined frequency band for uplink (UL) communications, where the first defined frequency band and the second defined frequency band may have different regulatory requirements and/or usage rules (e.g., power spectral density limitations) as described with reference to FIG. 4. The pairing of different defined frequency bands for a wireless link (e.g., selecting two different defined frequency bands for uplink and downlink communications, respectively) can include selecting two defined frequency bands from a same (defined) frequency range, selecting the first defined frequency band and the second defined frequency band across different defined frequency ranges (e.g., FR1 and FR2), and/or selecting two defined frequency bands with different bandwidths. Alternatively or additionally, the pairing of different defined frequency bands can include transitioning use of an existing defined frequency band (e.g., currently being used for a wireless link) from bidirectional to unidirectional by only using portions of the existing defined frequency band, and pairing the existing defined frequency band with a second, different defined frequency band.

Figure 5:
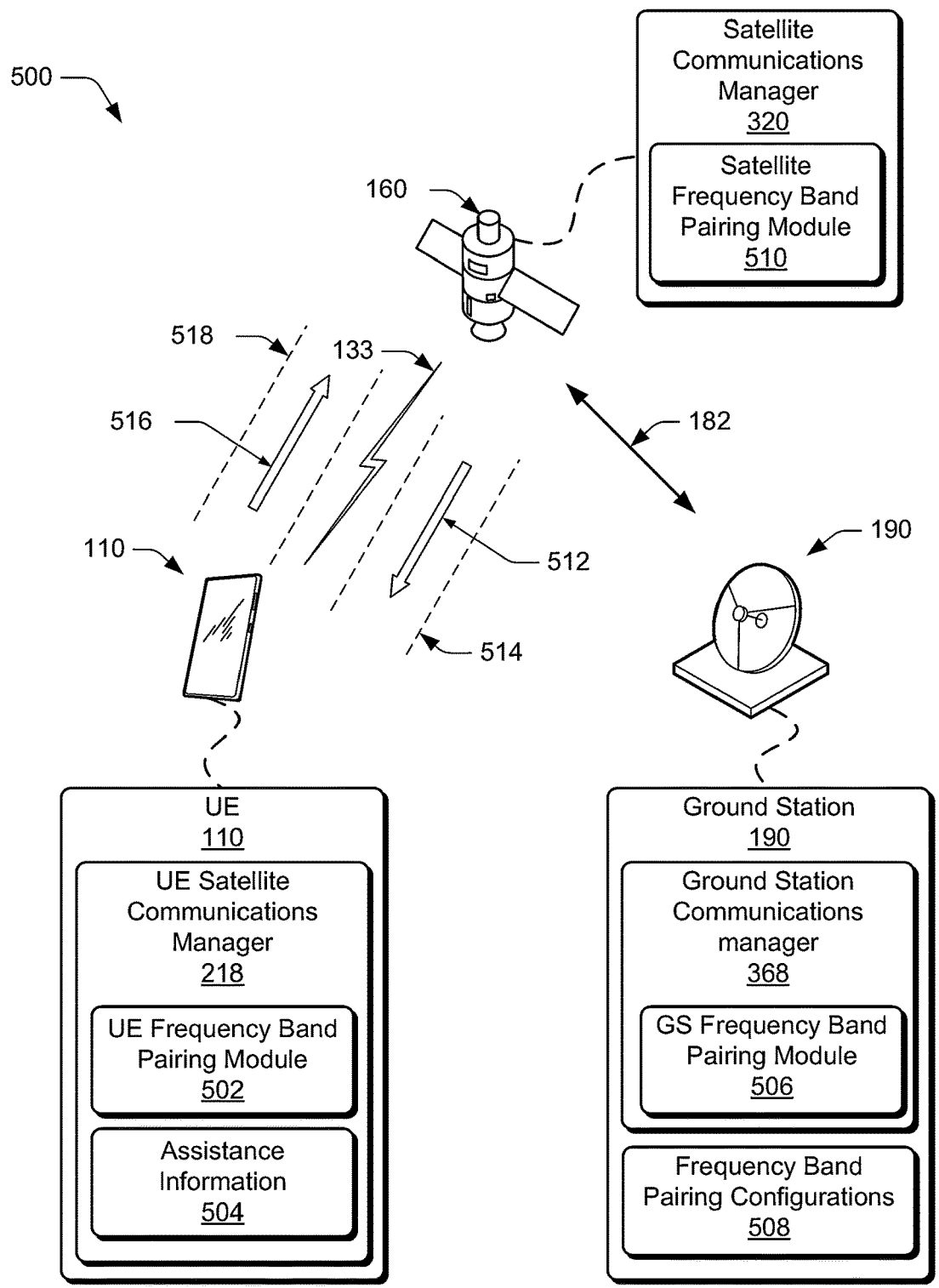
FIG. 5 illustrates an example environment that can be used in accordance with various aspects of flexible frequency band pairing for satellite communications.

FIG. 5 illustrates an example environment 500 in which aspects of flexible frequency band pairing for satellite communications can be implemented. In this example, the environment 500 includes a UE 110, a satellite 160, and a ground station 190, which may be implemented similar to or different from the UEs, satellites, and ground stations as described with reference to FIGS. 1-4. Generally, the UE 110 communicates with the satellite 160 via a wireless link 133, and the satellite 160 communicates with the ground station 190 through the interface 182. As described with respect to FIG. 1, the ground station 190 communicates with a non-terrestrial core network 155, a terrestrial core network 150, and/or a base station 120 of that terrestrial core network (not shown in FIG. 5). In aspects, the satellite 160, the ground station 190, and the core network form a non-terrestrial communication system with which the UE 110 communicates.

As shown in FIG. 5, the UE 110 is implemented with a UE satellite communications manager 218 that includes a UE frequency band pairing module 502 and satellite assistance information 504 (assistance information 504). In aspects, the UE satellite communications manager 218 determines or generates the assistance information 504, and the UE frequency band pairing module 502 uses at least some information included in the assistance information 504 to determine UE-requested frequency-band-pairing settings. To illustrate, the assistance information 504 includes and/or indicates various UE-observed metrics, such as a location of the UE 110, respective locations of the satellite 160 or other satellites as observed by the UE, mobility characteristics of the UE (e.g., velocity, heading, or direction), SNRs of respective satellite wireless links, or the like. Based on information in the assistance information 504, the UE frequency band pairing module 502 generates UE-requested frequency-band-pairing settings that request frequency band pairings to use for the wireless link 133.

As one example, by analyzing the assistance information, the UE frequency band pairing module 502 identifies that an SNR for a satellite wireless link has fallen below a threshold that indicates an acceptable performance level and determines UE-requested frequency-band-pairing settings that mitigate the SNR. The UE-requested frequency-band-pairing settings, for instance, request to reuse an existing bidirectional defined frequency band currently used for the wireless link 133 as a unidirectional frequency band for uplink communications. Alternatively or additionally, the UE-requested frequency-band-pairing settings request to add an additional, different defined frequency band for downlink communications. In aspects, the UE frequency band pairing module 502 selects the additional, different defined frequency band based on one or more usage rules defined by a governing entity, such as power spectral density limitations. The UE-requested frequency-band-pairing settings may request any combination of frequency band parings, such as the K band for UL and L band for DL, the S band for UL and the L band for DL, the X band for UL and the L band for DL, the Ka band for UL and the X band for DL, the X band for both DL and UL, or the like. Other examples include requesting any combination of defined frequency bands as described with reference to FIG. 4. In some aspects, after generating the UE-requested frequency-band-pairing settings, the UE frequency band pairing module 502 includes the UE-requested frequency-band-pairing settings in the assistance information 504.

The ground station 190 of the non-terrestrial communication system includes, by way of the ground station communications manager 368 of FIG. 3, a ground station frequency band pairing module 506 (GS frequency band pairing module 506) to implement various functionalities associated with flexible frequency band pairing in a satellite communication system. In some cases, and in a manner similar to the UE frequency band pairing module 502, the GS frequency band pairing module 506 determines one or more frequency band pairing configurations 508 for a wireless link between the UE 110 and the satellite 160, where the ground station 190 optionally stores the frequency band pairing configuration(s) 508 on CRM 364 as device data 366 (not shown in FIG. 5). This can include determining the frequency band pairing configurations 508 using UE-observed metrics included in assistance information and/or UE-requested frequency-band-pairing settings received from the UE 110 by way of the satellite 160 and the interface 182. Alternatively, in some aspects, the GS frequency band pairing module 506 determines the frequency band pairing configurations 508 without receiving the assistance information and/or UE-requested frequency-band-pairing settings from the UE 110 (by way of the satellite 160).

In some aspects, the ground station 190 and/or the satellite 160 receive a request from the UE 110 to utilize frequency band pairing. To illustrate, the UE 110 sends the request implicitly by sending UE-requested frequency-band-pairing settings to the ground station 190 and/or the satellite 160. As another example, the UE 110 sends the request explicitly, such as through an RRC message with a designated field, flag, and so forth, that specifies the request to use frequency band pairing.

Generally, a frequency band pairing configuration specifies two or more defined frequency bands to use for a wireless link between the UE 110 and the satellite 160. To illustrate, the frequency band pairing configurations 508 specify a first defined frequency band to use as a unidirectional frequency band for unidirectional downlink communications and a second defined frequency band to use as a unidirectional frequency band for unidirectional uplink communications. In some aspects, the frequency band pairing configuration indicates to utilize a bidirectional frequency band as a unidirectional frequency band, such as by indicating to use only an uplink portion of a bidirectional frequency band or only a downlink portion of the bidirectional frequency band. This may include transitioning the use of an existing defined frequency band from bidirectional to unidirectional. Alternatively, in some aspects, the frequency band pairing configurations 508 specify (i) a bidirectional frequency band for uplink and downlink communications between the UE 110 and the satellite 160, and (ii) a unidirectional frequency band for supplementary uplink (SUL) or supplementary downlink (SDL) communications. Thus, a frequency band pairing configuration can specify two unidirectional frequency bands (e.g., for unidirectional downlink communications and for unidirectional uplink communications) or can specify a bidirectional frequency band in combination with a unidirectional frequency band. The frequency band pairing configuration can specify, for the frequency band pairing, defined frequency bands in a same defined frequency range, or frequency bands defined in different frequency ranges.

In aspects, the satellite 160, by way of the satellite communications manager 320, optionally includes a satellite frequency band pairing module 510 that operates in similar manners as described with reference to the UE frequency band pairing module 502 and/or the GS frequency band pairing module 506. In other aspects, the satellite 160 relays frequency band pairing communications between the UE 110 and the ground station 190 using the interface 182. To illustrate, the satellite 160 relays assistance information and/or UE-requested frequency-band-pairing settings from the UE 110 to the ground station 190, and relays frequency band pairing configurations from the ground station 190 to the UE 110.

The UE 110 and satellite 160 communicate via the wireless link 133, which may be implemented using multiple defined frequency bands as shown in FIG. 5. This can include dynamically modifying which defined frequency bands are used for the wireless link 133. To illustrate, the UE 110 and the satellite 160 may initially establish the wireless link 133 using a single, bidirectional frequency band. Based on various factors, such as by observing signal degradation through one or more signal-quality and/or link-quality metrics or observing a need to increase downlink or uplink throughput, the UE 110 and the satellite 160 modify the wireless link 133 to use multiple defined frequency bands as further described. However, in some aspects, the non-terrestrial communication system statically configures the wireless link 133 to use multiple defined frequency bands, such as during establishment.

In some aspects, and as shown in FIG. 5, the multiple defined frequency bands paired with one another may reside in different defined frequency ranges. For example, the satellite 160 uses a first defined frequency band 512 in a first frequency range 514 (e.g., FR1) for downlink communications to the UE 110. The UE 110 uses a second defined frequency band 516 in a second defined frequency range 518 (e.g., FR2) for uplink communications to the satellite 160.

Flexible frequency band pairing can be static (e.g., preconfigured) or dynamic. When the usage of a frequency band changes from bidirectional to unidirectional (e.g., signaled by the base station to the UE via broadcast, multi-cast, or unicast message), the UE can switch (e.g., automatically or by default) to another pre-configured band for the other direction. Alternatively, the ground station 190 specifies, by way of the satellite 160, the frequency band pairing configuration dynamically with broadcast, multicast, or unicast messages to the UE 110. Generally, the UE 110, satellite 160, or ground station 190 may configure frequency band pairings for uplink and downlink communications based on any suitable conditions or parameters, which may include UE position, satellite position, downlink SNR, UE battery level, UE transmit power, a data or link QoS level, or the like. In some cases, the UE 110 can request, by way of the UE-requested frequency-band-pairing settings, that uplink or downlink communications be switched to another frequency range based on a location of the UE, location of a satellite, UE battery level, UL power level, an observed SNR of downlink communications from the satellite communication system, and so on.

Figure 6:
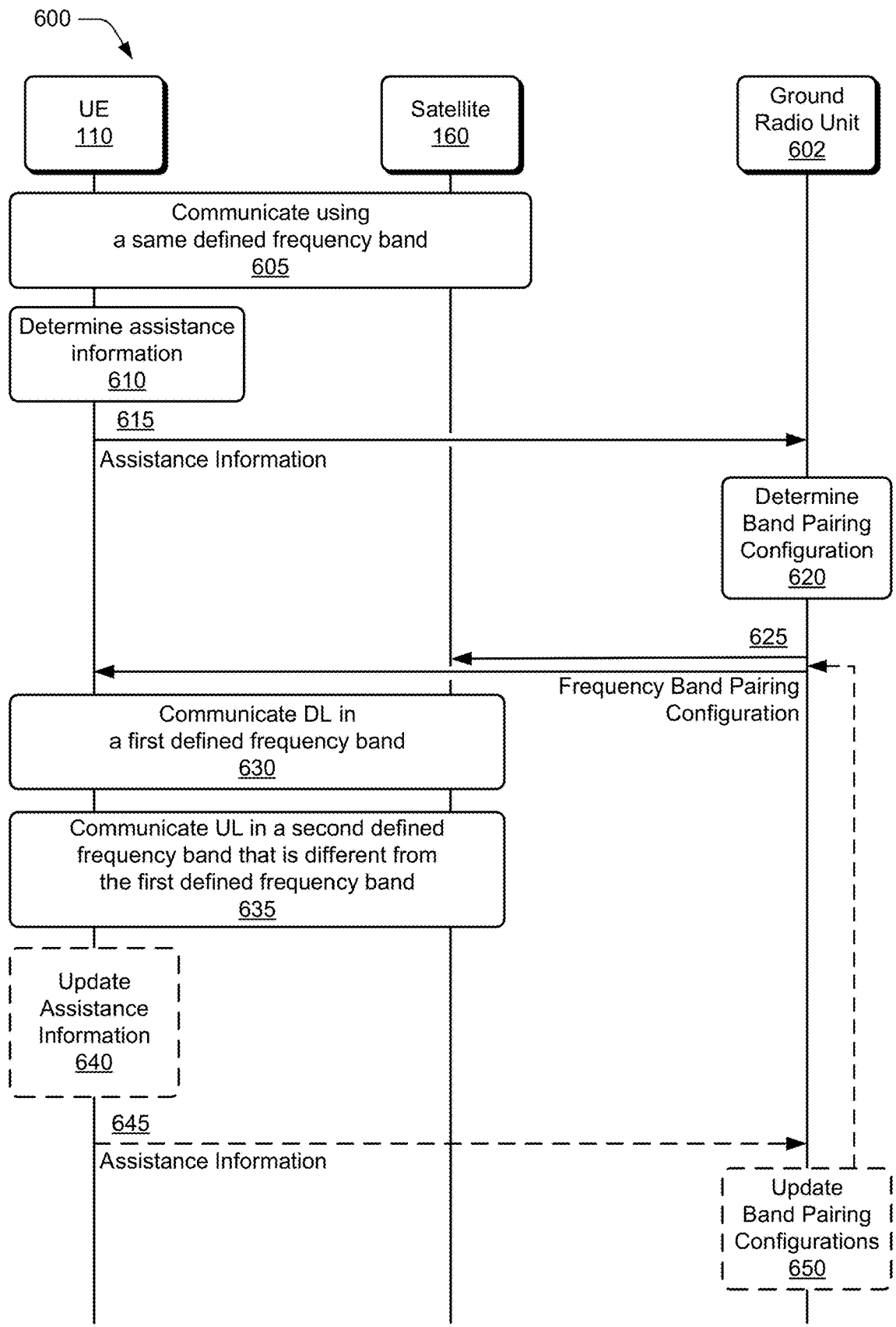
FIG. 6 illustrates an example signaling and control transaction diagram that can be used to perform aspects of flexible frequency band pairing for satellite communications.

FIG. 6 illustrates an example signaling and control transaction diagram 600 that includes a combination of actions, signaling transactions, and/or control transactions that can be used to perform aspects of flexible frequency band pairing for satellite communications. The transactions described with reference to the diagram 600 can be performed using the various aspects described with reference to FIGS. 1-5. Optional transactions in the diagram 600 are denoted with dashed lines. The transactions may be performed by a combination of devices, such as the UE 110 of FIG. 1, the satellite 160 of FIG. 1, and a ground radio unit 602, where the ground radio unit 602 can correspond to the ground station 190 (e.g., in a bent pipe architecture where the satellite 160 acts as a transponder) or the satellite 160 (e.g., when the satellite 160 includes ground station functionalities).

At 605, the UE 110 and the satellite 160 communicate with one another using a same frequency band. For example, the UE and satellite may communicate using a bidirectional frequency band using a TDD or a FDD scheme.

At 610, the UE determines assistance information. For example, the assistance information may include any combination of UE-observed metrics, such as a location of the UE, observed SNRs for one or more satellites, mobility characteristics of the UE, or the like. In some aspects, as part of determining the assistance information, the UE 110 determines UE-requested frequency-band-pairing settings based on the UE-observed metrics and/or conditions at the UE, such as UE battery level, a receive strength signal indication (RSSI), a reference signal receive power (RSRP), desired UE data throughput, an available UL power of the UE, UE RRC state, or the like.

At 615, the UE 110 transmits, directly or indirectly, the assistance information to the ground radio unit 602 of the non-terrestrial communication system. For example, in a bent pipe architecture, when the ground radio unit 602 corresponds to the ground station 190 and the satellite 160 acts as a relay, the UE 110 sends the assistance information to the ground station using an indirect communication (e.g., through the satellite). As another example, when the ground radio unit 602 corresponds to the satellite 160 (e.g., includes gNB-DU functions or is a satellite with a collocated base station), the UE 110 sends the assistance information to the satellite 160 using a direct communication. In some aspects, the assistance information includes a request to begin utilizing two different defined frequency bands (e.g., defined by one or more governing entities) for the wireless link between the UE and satellite and/or includes the UE-requested frequency-band-pairing settings as described.

At 620, the ground radio unit 602 determines a frequency band pairing configuration (e.g., the frequency band pairing configuration 508) for a wireless link between the UE 110 and the satellite 160. In some cases, the ground radio unit 602 (e.g., by way of the GS frequency band pairing module 506 of the ground station 190, by way of the satellite frequency band pairing module 510 of the satellite 160) determines a frequency band pairing configuration that uses different, defined frequency bands for UL and DL communications based on UE-observed metrics included in the assistance information (e.g., a location of the UE, a location of the satellite, UE-supported frequency bands, RSSI, RSRP, and/or the observed SNR provided by the UE). Alternatively or additionally, the ground radio unit 602 determines the frequency band pairing configuration using other conditions at the UE (e.g., battery level, data throughput requirements). In aspects, when the ground radio unit 602 determines to transition the usage of an existing defined frequency band from bidirectional to unidirectional, the ground radio unit 602 selects another defined frequency band to pair with the existing defined frequency band as described with reference to FIGS. 4 and 5.

Generally, a frequency band pairing module of the ground station 190, the satellite 160, and/or the UE 110 can determine a frequency band pairing configuration for a wireless link between the UE 110 and the satellite 160 that improves the communication needs of the UE. For example, when a measured UE DL SINR for a first band is low (e.g., below a DL SINR threshold), then the respective frequency band pairing module directs the UE (e.g., by way of the frequency band pairing configuration) to use a separate DL band to improve the DL SINR. In other cases, when a satellite observed UL SINR is low (e.g., below a UL SINR threshold), the frequency band pairing module can direct (e.g., command) the UE to switch to a separate UL band by updating (and communicating) the frequency band pairing configuration accordingly. Thus, a frequency band pairing module may determine a frequency band pairing configuration or a frequency band pairing configuration update based on one or more parameters (e.g., included in the assistance information, sent or generated separately from the assistance information) to improve communication performance of the UE, such as by through comparison with a respective threshold to determine when to make changes to the frequency band pairing configuration.

At 625, the ground radio unit 602 sends, directly or indirectly, the frequency band pairing configuration to the UE 110 and the satellite 160. For example, in the bent pipe architecture, the ground radio unit 602 corresponds to the ground station 190 and sends the band pairing information to the UE indirectly through the satellite. As another example, when the ground radio unit 602 corresponds to the satellite 160 (e.g., includes gNB-DU functions or is a satellite with a collocated base station), the satellite 160 sends the frequency band pairing configuration directly to the UE. In some cases, the ground radio unit 602 sends the frequency band pairing configuration to the UE via a broadcast, a multi-cast, or a unicast message. The ground radio unit 602 (e.g., as the ground station 190) may also transmit the band pairing configuration to the satellite 160 for use in downlink transmissions to the UE or to receive uplink transmissions from the UE.

At 630, the UE and satellite communicate DL traffic using a first defined frequency band based on the frequency band pairing configuration. For example, the UE and satellite may use a first defined frequency band (e.g., FR1) as a unidirectional frequency band for downlink traffic (e.g., DL only). At 635, the UE and satellite communicate UL traffic using a second defined frequency band based on the frequency band pairing configuration, where the second defined frequency band may be included in the first defined frequency range or may be included in a second defined frequency range (e.g., FR2). The UE and satellite may use the second defined frequency band as a unidirectional frequency band for uplink traffic (e.g., UL only).

At 640, the UE 110 optionally updates or redetermines the assistance information. For example, responsive to movement, atmospheric (e.g., weather) changes, or changes in SNR, the UE 110 may reevaluate conditions and determine an update to a current frequency band pairing configuration and generate updated UE-requested frequency-band-pairing settings. At 645, the UE 110 transmits, directly or indirectly, the updated assistance information and/or the updated UE-requested frequency-band-pairing settings to the ground radio unit 602. For example, in the bent pipe architecture, where the ground radio unit 602 corresponds to the ground station 190 includes base station functionalities and the satellite 160 acts as a relay, the UE 110 can send the updated assistance information and/or updated UE-requested frequency-band-pairing settings in an indirect communication to the ground station 190 through the satellite 160. As another example, when the ground radio unit 602 corresponds to the satellite 160 (e.g., includes gNB-DU functions or is a satellite with a collocated base station), the UE 110 can send the updated assistance information and/or UE-requested frequency-band-pairing settings in a direct communication to the satellite 160.

At 650, the ground radio unit 602 optionally updates the frequency band pairing configurations for the UE 110 and/or the satellite 160 based on the updated assistance information and/or the updated UE-requested frequency-band-pairing settings. For example, the ground radio unit 602 602 (e.g., by way of the GS frequency band pairing module 506 of the ground station 190, by way of the satellite frequency band pairing module 510 of the satellite 160) determines a different band pairing for UL and/or DL traffic based on a location of the UE, a location of the satellite, and/or the observed SNR provided by the UE. This different band pairing could continue to use different defined frequency bands or return the satellite and UE to the original same defined frequency band as event 605 or another same frequency band. From operation 650, the ground radio unit 602 optionally returns to operation 625 to send the updated frequency band pairing configuration to the UE 110 and/or the satellite 160 using a delta configuration change or by sending a replacement full configuration for flexible frequency band pairing.

Example Methods

Figure 7:
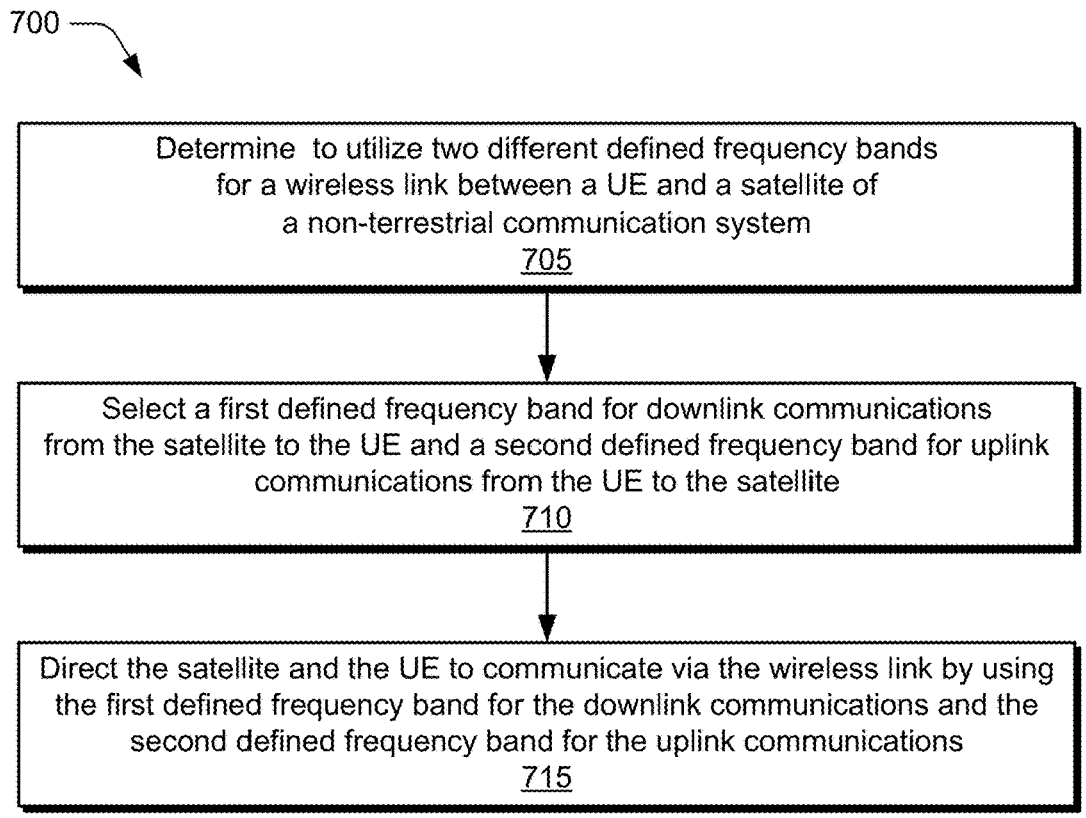
FIG. 7 illustrates an example method that can be used to perform various aspects of flexible frequency band pairing for satellite communications.

Example methods 700 and 800 are described with reference to FIGS. 7 and 8 in accordance with one or more aspects of flexible frequency band pairing for satellite communications. FIG. 7 illustrates an example method 700 for communicating in a non-terrestrial communication system using multiple frequency bands. In aspects, operations of the method 700 are performed by a device in a non-terrestrial communication system, such as the ground station 190 and/or the satellite 160. As one example, the ground station communicates to the satellite and the satellite acts as a relay. Alternatively, the ground station and the satellite are integrated with one another and/or the satellite performs the operations autonomously.

At 705, a device in the non-terrestrial communication system determines to utilize two different defined frequency bands for a wireless link between a satellite of the non-terrestrial communication system and a UE. As one example, the ground station 190 receives assistance information and/or UE-requested frequency-band-pairing settings from a UE 110, by way of the satellite 160 as described at 615 of FIG. 6 and with reference to FIG. 5. In various aspects, the two different defined frequency bands correspond to frequency bands defined by one or more governing entities (e.g., government-defined frequency bands, standards-defined frequency bands, and/or committee-defined frequency bands).

At 710, the device in the non-terrestrial communication system selects a first defined frequency band for downlink communications from the satellite to the UE and a second defined frequency band for uplink communications from the UE to the satellite. As one example, the ground station 190 selects a first defined frequency band from a first defined frequency range and a second defined frequency band from a second defined frequency range that is different from the first defined frequency range as described at 620 of FIG. 6 and with reference to FIGS. 4 and 5. Alternatively, the ground station 190 selects the first defined frequency band and the second defined frequency band from a same defined frequency range. In some aspects, and in a similar manner as the ground station 190, the satellite 160 selects the first defined frequency band and the second defined frequency band. This can include selecting the first and/or second defined frequency bands based on assistance information and/or UE-requested frequency-pairing settings received from the UE.

At 715, the device in the non-terrestrial communication system directs the satellite and the UE to communicate via the wireless link using the first defined frequency band for the downlink communications and the second defined frequency band for the uplink communications. As one example, the ground station 190 communicates directions to commence communications via frequency band pairing by communicating a frequency band pairing configuration to the satellite 160 and the UE 110 as described at 625 of FIG. 6.

Figure 8:
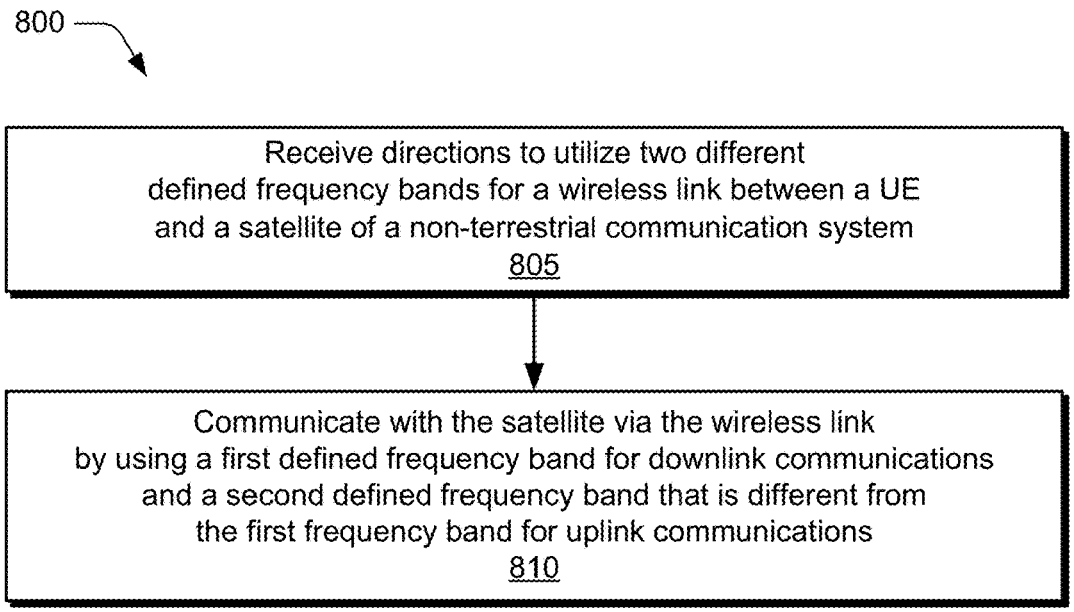
FIG. 8 illustrates an example method that can be used to perform various aspects of flexible frequency band pairing for satellite communications.

FIG. 8 illustrates an example method 800 for using multiple frequency bands for a wireless link between a UE and a satellite in a non-terrestrial communication system. In aspects, operations of the method 800 are performed by a user equipment, such as the UE 110.

At 805, a UE receives, from a device in a non-terrestrial communication system, directions to utilize two different defined frequency bands for a wireless link between the satellite and the UE. To illustrate, the UE (e.g., the UE 110) receives a frequency band pairing configuration from the ground station 190 and/or the satellite 160 as described at 625 of FIG. 6 and with reference to FIG. 5. This may include directions to utilize only a portion of a bidirectional frequency band (e.g., only downlink portions, only uplink portions) to effectively communicate over the bidirectional frequency band in a unidirectional manner. In some aspects, the UE 110 receives the directions to utilize the two different defined frequency bands in response to sending assistance information and/or UE-requested frequency-band-pairing settings to the non-terrestrial communication system (e.g., the satellite 160 and/or the ground station 190) as described at 615 of FIG. 6. In various aspects, the two different defined frequency bands correspond to frequency bands defined by one or more governing entities (e.g., government-defined frequency bands, standards-defined frequency bands, and/or committee-defined frequency bands).

At 810, the UE wirelessly communicates with the satellite via the wireless link using a first defined frequency band for downlink communications and a second defined frequency band that is different from the first defined frequency band for uplink communications. As one example, the UE 110 uses a first defined frequency band from a first defined frequency range for the downlink communications over the wireless link (e.g., the wireless link 133) and a second defined frequency band from a second defined frequency range for uplink communications over the wireless link as described at 630 and at 635 of FIG. 6. Alternatively, the UE 110 uses the first defined frequency band and the second defined frequency band from a same frequency range. In some aspects, the UE 110 uses a bidirectional frequency band as a unidirectional frequency band, such as by only using a portion of the bidirectional frequency band assigned to downlink communications or only using a portion of the bidirectional frequency band assigned to uplink communications.

The order in which the transaction diagram and/or method blocks are described is not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-chip systems (SoCs), Complex Programmable Logic Devices (CPLDs), and the like.

Although aspects of flexible frequency band pairing for satellite communications have been described in language specific to features and/or methods, the subject matter of this disclosure is not necessarily limited to the specific features or operations described. Rather, the specific features and methods are disclosed as example implementations of flexible frequency band pairing for satellite communications, and other equivalent features and operations are intended to be within the scope of the described subject matter. It is to be appreciated that each described aspect can be implemented independently or in connection with one or more other described aspects. In the following, several examples are described: Example 1: A method performed by a device in a non-terrestrial communication system for using multiple defined frequency bands for a wireless link between a user equipment, UE, and a satellite of the non-terrestrial communication system, the method comprising: determining, by the device, to utilize two different defined frequency bands for the wireless link between the UE and the satellite, the two different defined frequency bands being defined by a governing entity; selecting a first defined frequency band for downlink communications from the satellite to the UE and a second defined frequency band for uplink communications from the UE to the satellite; and directing, by the device, the satellite and the UE to communicate via the wireless link by using the first defined frequency band for the downlink communications and the second defined frequency band for the uplink communications.

Example 2: The method as recited in example 1, wherein determining to utilize the two different defined frequency bands further comprises: selecting the first defined frequency band from a first defined frequency range and the second defined frequency band from a second defined frequency range that is different from the first defined frequency range; or selecting the first defined frequency band and the second defined frequency band from a same frequency range.

Example 3: The method as recited in example 1 or example 2, wherein directing the satellite and the UE to communicate via the wireless link by using the first defined frequency band and the second defined frequency band further comprises: directing the satellite and the UE to use a frequency band classified by the governing entity as a bidirectional frequency band as a unidirectional frequency band.

Example 4: The method as recited in example 3, wherein directing the satellite and the UE to use the frequency band classified by the governing entity as the bidirectional frequency band as the unidirectional frequency band further comprises at least one of: directing the satellite and the UE to only use a downlink portion or an uplink portion of a frequency division duplex, FDD, bidirectional frequency band as the unidirectional frequency band; or directing the satellite and the UE to use only a downlink portion or an uplink portion of a time division duplex, TDD, bidirectional frequency band as the unidirectional frequency band.

Example 5: The method as recited in any one of the preceding examples, wherein directing the satellite and the UE to wirelessly communicate using the first defined frequency band for the downlink communications and the second defined frequency band for the uplink communications further comprises: communicating a frequency band pairing configuration to the UE; or communicating a frequency band pairing configuration update to the UE.

Example 6: The method as recited in claim 4, wherein directing the satellite and the UE to use the frequency band classified by the governing entity as the bidirectional frequency band as the unidirectional frequency band further comprises one of: directing the satellite and the UE to use the downlink portion of the FDD bidirectional frequency band for unidirectional downlink communications and the uplink portion of the TDD bidirectional frequency band for unidirectional uplink communications; or directing the satellite and the UE to use the downlink portion of the TDD bidirectional frequency band for the unidirectional downlink communications and the uplink portion of the FDD bidirectional frequency band for the unidirectional uplink communications.

Example 7: The method as recited in any one of the preceding examples, wherein determining to utilize the two different defined frequency bands for the wireless link further comprises: (i) receiving a request from the UE to utilize the two different defined frequency bands for the wireless link; or (ii) analyzing assistance information from the UE; and determining to utilize the two different defined frequency bands in response to analyzing the assistance information.

Example 8: The method as recited in example 7, wherein determining to utilize the two different defined frequency bands for the wireless link comprises receiving the request from the UE, and wherein receiving the request from the UE further comprises: receiving one or more UE-requested frequency-band-pairing settings from the UE.

Example 9: The method as recited in any one of the preceding examples, wherein directing the satellite and the UE to wirelessly communicate using the first defined frequency band and the second defined frequency band further comprises at least one of: directing the satellite and the UE to use, as the first defined frequency band, a frequency band classified by the governing entity for supplementary downlink communications; or directing the satellite and the UE to use, as the second defined frequency band, a frequency band classified by the governing entity for supplementary uplink communications Example 10: A method performed by a user equipment, UE, for using multiple defined frequency bands for a wireless link between the UE and a satellite in a non-terrestrial communication system, the method comprising: receiving, from a device in the non-terrestrial communication system, directions to utilize two different defined frequency bands for the wireless link between the UE and the satellite, the two different defined frequency bands being defined by a governing entity; and communicating with the satellite via the wireless link by using a first defined frequency band for downlink communications transferred over the wireless link and a second defined frequency band that is different from the first defined frequency band for uplink communications.

Example 11: The method as recited in example 10, wherein receiving the directions to utilize the two different defined frequency bands further comprises: receiving directions to use the first defined frequency band from a first defined frequency range and the second defined frequency band from a second defined frequency range that is different from the first defined frequency range; or receiving directions to use the first defined frequency band and the second defined frequency band from a same frequency range.

Example 12: The method as recited in example 10 or example 11, further comprising: receiving directions to utilize a bidirectional frequency band as a unidirectional frequency band.

Example 13: The method as recited in example 12, wherein receiving directions to utilize the bidirectional frequency band as the unidirectional frequency band further comprises: receiving directions to utilize only a downlink portion or an uplink portion of a frequency division duplex, FDD, bidirectional frequency band as the unidirectional frequency band; or receiving directions to only utilize a downlink portion or an uplink portion of a time division duplex, TDD, bidirectional frequency band as the unidirectional frequency band.

Example 14: The method as recited in any one of examples 10 to 13, wherein receiving the directions to utilize the two different defined frequency bands for the wireless link further comprises: transmitting, to the device in the non-terrestrial communication system, a request to utilize the two different defined frequency bands for the wireless link; and receiving the directions to utilize the two different defined frequency bands for the wireless link in response to transmitting the request.

Example 15: The method as recited in any one of examples 10 to 14, wherein receiving the directions to utilize the two different defined frequency bands further comprises: receiving directions to utilize, as the first defined frequency band, a frequency band classified by the governing entity for supplementary downlink communications; or receiving directions to utilize, as the second defined frequency band, a frequency band classified by the governing entity for supplementary uplink communications.

Example 16: A method performed by a satellite for using multiple defined frequency bands for a wireless link between a user equipment, UE, and the satellite in a non-terrestrial communication system, the method comprising: receiving, from a device in the non-terrestrial communication system, directions to utilize two different defined frequency bands for the wireless link between the UE and the satellite, the two different defined frequency bands being defined by a governing entity; and communicating with the user equipment via the wireless link by using a first defined frequency band for downlink communications transferred over the wireless link and a second defined frequency band that is different from the first defined frequency band for uplink communications.

Example 17: An apparatus comprising: a wireless transceiver; a processor; and computer-readable storage media comprising instructions that, responsive to execution by the processor, direct the apparatus to perform a method as recited in any one of examples 1 to 16.

Example 18: Computer-readable storage media comprising instructions that, responsive to execution by a processor, direct an apparatus to perform a method as recited in any one of examples 1 to 16.

What is claimed is:

1. A method performed by a device in a non-terrestrial communication system, the method comprising:
    determining to utilize two different frequency bands defined by a governing entity for a wireless link between a user equipment (UE) and a satellite of the non-terrestrial communication system;
    selecting a first frequency band among the two different frequency bands for downlink communications from the satellite to the UE, the first frequency band that is classified by the governing entity as a bidirectional frequency band being used as a unidirectional frequency band, and having a first power spectral density limitation higher than a second power spectral density limitation of a second frequency band among the two different frequency bands, the first and second power spectral density limitation being specified by the governing entity in usage rules; and
    directing the satellite and the UE to communicate via the wireless link by using the first frequency band for the downlink communications to the UE.

2. The method as recited in claim 1, wherein the directing the satellite and the UE to communicate via the wireless link by using the first frequency band for the downlink communications comprises at least one of:
    directing the satellite and the UE to only use a downlink portion or an uplink portion of a frequency division duplex (FDD) bidirectional frequency band as the unidirectional frequency band; or
    directing the satellite and the UE to use only a downlink portion or an uplink portion of a time division duplex (TDD) bidirectional frequency band as the unidirectional frequency band.

3. The method as recited in claim 1, further comprising:
    receiving a request from the UE to utilize the two different frequency bands for the wireless link, wherein the determining to utilize the two different frequency bands is in response to the receiving the request.

4. The method as recited in claim 3, further comprising:
    analyzing the assistance information included in the request received from the UE, wherein the determining to utilize the two different frequency bands is based on the analyzing the assistance information that conveys at least one of: UE-observed metrics, UE mobility characteristics, UE received signal quality, or a UE-suggested first and second frequency band.

5. The method as recited in claim 1, wherein the directing the satellite and the UE to communicate via the wireless link by using the first frequency band for the downlink communications comprises:
    directing the satellite and the UE to use, as the first frequency band, a frequency band classified by the governing entity for supplementary downlink communications.

6. A method performed by a user equipment (UE), for communicating via a wireless link with a satellite in a non-terrestrial communication system, the method comprising:

transmitting, to a device in the non-terrestrial communication system, a request to utilize the two different frequency bands defined by a governing entity, for the wireless link;

receiving, from the device in the non-terrestrial communication system, directions to utilize two different frequency bands for the wireless link between the UE and the satellite, the directions requiring the UE to utilize a first frequency band among the two different frequency bands that is defined as a bidirectional frequency band, as an unidirectional frequency band, and having a first power spectral density limitation higher than a second power spectral density limitation of a second frequency band among the two different frequency bands, the first and second power spectral density limitation being specified by the governing entity in usage rules; and communicating with the satellite via the wireless link by using the first frequency band for downlink communications over the wireless link and a second frequency band among the two different frequency bands that is different from the first frequency band for uplink communications.

7. The method as recited in claim 6, wherein the receiving directions comprises:
   receiving directions to utilize only a downlink portion or an uplink portion of a frequency division duplex (FDD) bidirectional frequency band as the unidirectional frequency band; or
   receiving directions to utilize only a downlink portion or an uplink portion of a time division duplex (TDD) bidirectional frequency band as the unidirectional frequency band.

8. The method as recited in claim 6, wherein the request includes assistance information that conveys at least one of: UE-observed metrics, UE mobility characteristics, UE received signal quality, or a UE-suggested first and second frequency band.

9. The method as recited in claim 6, wherein the receiving the directions comprises:
   receiving directions to utilize, as the second frequency band, a frequency band classified by the governing entity for supplementary uplink communications.

10. An apparatus in a non-terrestrial communication system, comprising:
    a wireless transceiver;
    a processor; and
    computer-readable storage media comprising instructions that, responsive to execution by the processor, direct the apparatus to:
    determine to utilize two different frequency bands for a wireless link between a user equipment (UE) and a satellite of the non-terrestrial communication system;
    select a first frequency band among the two different frequency bands for downlink communications from a satellite to the UE, the first frequency band that is classified by a governing entity as a bidirectional frequency band being used as a unidirectional frequency band, and having a first power spectral density limitation higher than a second power spectral density limitation of a second frequency band among the two different frequency bands, the first and second power spectral density limitation being specified by the governing entity in usage rules; and
    direct the satellite and the UE to communicate via the wireless link by using the first frequency band for the downlink communications.

11. The apparatus of claim 10, wherein the instructions to direct the satellite and the UE to communicate via the wireless link by using the first frequency band for the downlink communications further direct the apparatus to:
    direct the satellite and the UE to only use a downlink portion or an uplink portion of a frequency division duplex (FDD) bidirectional frequency band as the unidirectional frequency band; or
    direct the satellite and the UE to use only a downlink portion or an uplink portion of a time division duplex (TDD) bidirectional frequency band as the unidirectional frequency band.

12. The apparatus of claim 10, wherein the instructions further direct the apparatus to receive a request from the UE to utilize the two different frequency bands for the wireless link, wherein the apparatus determines to utilize the two different frequency bands in response to receiving the request.

13. The apparatus of claim 10, wherein the instructions further direct the apparatus to analyze assistance information from the UE, wherein the apparatus determines to utilize the two different frequency bands in response to analyzing the assistance information that conveys at least one of: UE-observed metrics UE mobility characteristics, UE received signal quality, or a UE-suggested first and second frequency band.

14. The apparatus of claim 10, wherein the instructions to direct the satellite and the UE to communicate are further executable to direct the apparatus to:
    direct the satellite and the UE to use, as the first frequency band, a frequency band classified by the governing entity for supplementary downlink communications.

15. A user equipment (UE) comprising:
    a wireless transceiver;
    a processor; and
    computer-readable storage media comprising instructions that, responsive to execution by the processor, direct the UE to communicate via a wireless link with a satellite in a non-terrestrial communication system including to:
    transmit, to a device in the non-terrestrial communication system, a request to utilize the two different frequency bands defined by a governing entity, for the wireless link;
    receive, from the device in a non-terrestrial communication system, directions to utilize two different frequency bands for a wireless link between the UE and the satellite, the directions requiring the UE to utilize a first frequency band among the two different frequency bands that is defined as a bidirectional frequency band, as an unidirectional frequency band, and having a first power spectral density limitation higher than a second power spectral density limitation of a second frequency band among the two different frequency bands, the first and second power spectral density limitation being specified by the governing entity in usage rules; and
    communicate with the satellite via the wireless link by using the first frequency band for downlink communications over the wireless link and a second frequency band that is different from the first frequency band for uplink communications.

16. The UE of claim 15, wherein the instructions to receive directions are further executable to direct the UE to:
    receive directions to utilize only a downlink portion or an uplink portion of a frequency division duplex (FDD) bidirectional frequency band as the unidirectional frequency band; or receive directions to utilize only a downlink portion or an uplink portion of a time division duplex (TDD) bidirectional frequency band as the unidirectional frequency band.

17. The UE of claim 15, wherein the request includes assistance information that conveys at least one of: UE-observed metrics, UE mobility characteristics, UE received signal quality, or a UE-suggested first and second frequency band.

18. The UE of claim 15, wherein the instructions to receive directions are further executable to direct the UE to:
receive directions to utilize, as a second frequency band, a frequency band classified by the governing entity for supplementary uplink communications.

19. The method as recited in claim 8, further comprising:
determining the UE-suggested first and second frequency band based on UE-observed metrics, UE mobility characteristics, UE received signal quality, and/or UE operational conditions.

20. The UE of claim 17, wherein the instructions further direct the UE to:
determine the UE-suggested first and second frequency band based on UE-observed metrics, UE mobility characteristics, UE received signal quality, and/or UE operational conditions.

* * * * *